(12) United States Patent
Srinivasan et al.

(10) Patent No.: US 9,069,979 B2
(45) Date of Patent: Jun. 30, 2015

(54) LDAP-BASED MULTI-TENANT IN-CLOUD IDENTITY MANAGEMENT SYSTEM

(71) Applicant: Oracle International Corporation, Redwood Shores, CA (US)

(72) Inventors: Uppili Srinivasan, Fremont, CA (US); Vasukiammaiyar Asokkumar, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 15 days.

(21) Appl. No.: 14/019,051

(22) Filed: Sep. 5, 2013

(65) Prior Publication Data

US 2014/0075501 A1    Mar. 13, 2014

Related U.S. Application Data

(63) Continuation-in-part of application No. 13/838,813, filed on Mar. 15, 2013.

(60) Provisional application No. 61/801,048, filed on Mar. 15, 2013, provisional application No. 61/698,463, (Continued)

(51) Int. Cl.
*H04L 9/32* (2006.01)
*G06F 21/62* (2013.01)
(Continued)

(52) U.S. Cl.
CPC .............. *G06F 21/62* (2013.01); *H04L 63/083* (2013.01); *H04L 63/20* (2013.01); *H04L 61/1523* (2013.01); *H04L 63/08* (2013.01); *H04L 63/104* (2013.01)

(58) Field of Classification Search
CPC ... H04L 61/1523; H04L 63/08; H04L 63/104; H04L 63/10; H04L 63/20; H04L 63/101; H04L 63/102
USPC .......... 726/1–6; 707/705, 781, 783–786, 797, 707/798
See application file for complete search history.

(56) References Cited

U.S. PATENT DOCUMENTS 6,052,684 A    4/2000 Du
6,085,188 A    7/2000 Bachmann et al.
(Continued)

FOREIGN PATENT DOCUMENTS

WO    WO2010/149222    12/2010
WO    2014039772       3/2014
(Continued)

OTHER PUBLICATIONS

An Introduction to Role-Based Access Control, NIST/ITL Bulletin, Retrieved from the Internet: URL: http://csrc.nist.gov/groups/SNS/rbac/documents/design_implementation/Intro_role_based_access.htm on Oct. 22, 2013, Dec. 1995, 5 pages.
(Continued)

*Primary Examiner* — Hosuk Song
(74) *Attorney, Agent, or Firm* — Kilpatrick Townsend & Stockton LLP

(57) ABSTRACT

A multi-tenant identity management (IDM) system enables IDM functions to be performed relative to various different customers' domains within a shared cloud computing environment and without replicating a separate IDM system for each separate domain. The IDM system can provide IDM functionality to service instances located within various different customers' domains while enforcing isolation between those domains. A cloud-wide identity store implemented as a single LDAP directory can contain identity information for multiple customers' domains. This single LDAP directory can store identities for entities for all tenants, in separate partitions or subtrees of the LDAP directory, each such partition or subtree being dedicated to a separate identity domain for a tenant. Components of the cloud computing environment ensure that LDAP entries within a particular subtree are accessible only to service instances that have been deployed to the identity domain that corresponds to that particular subtree.

20 Claims, 13 Drawing Sheets

Related U.S. Application Data filed on Sep. 7, 2012, provisional application No. 61/698,413, filed on Sep. 7, 2012, provisional application No. 61/698,459, filed on Sep. 7, 2012, provisional application No. 61/785,299, filed on Mar. 14, 2013.

(51) Int. Cl.
  *H04L 29/06* (2006.01)
  *H04L 29/12* (2006.01)

(56) References Cited

U.S. PATENT DOCUMENTS

| | | | |
|---|---|---|---|
| 6,236,988 B1 | 5/2001 | Aldred | |
| 6,516,416 B2 | 2/2003 | Gregg et al. | |
| 6,526,513 B1 | 2/2003 | Shrader et al. | |
| 6,553,364 B1 | 4/2003 | Wu | |
| 7,051,039 B1 | 5/2006 | Murthy et al. | |
| 7,136,867 B1 * | 11/2006 | Chatterjee et al. | 713/171 |
| 7,290,288 B2 | 10/2007 | Gregg et al. | |
| 7,664,866 B2 * | 2/2010 | Wakefield | 709/229 |
| 7,953,896 B2 | 5/2011 | Ward et al. | |
| 7,992,194 B2 * | 8/2011 | Damodaran et al. | 726/4 |
| 8,095,629 B2 | 1/2012 | Ward et al. | |
| 8,151,323 B2 * | 4/2012 | Harris et al. | 726/4 |
| 8,387,136 B2 | 2/2013 | Lee et al. | |
| 8,387,137 B2 | 2/2013 | Lee et al. | |
| 8,402,514 B1 | 3/2013 | Thompson et al. | |
| 8,434,129 B2 | 4/2013 | Kannappan et al. | |
| 8,572,602 B1 | 10/2013 | Colton et al. | |
| 8,631,477 B2 | 1/2014 | Chen et al. | |
| 8,631,478 B2 | 1/2014 | Chen et al. | |
| 8,769,622 B2 | 7/2014 | Chang et al. | |
| 8,769,704 B2 | 7/2014 | Peddada et al. | |
| 8,789,157 B2 | 7/2014 | Sinn | |
| 8,843,997 B1 * | 9/2014 | Hare | 726/3 |
| 2002/0059210 A1 | 5/2002 | Makus et al. | |
| 2002/0095395 A1 | 7/2002 | Larson et al. | |
| 2004/0215610 A1 | 10/2004 | Dixon et al. | |
| 2006/0059539 A1 | 3/2006 | Shashikumar et al. | |
| 2006/0143704 A1 | 6/2006 | Rits et al. | |
| 2006/0277595 A1 | 12/2006 | Kinser et al. | |
| 2007/0005536 A1 | 1/2007 | Caswell et al. | |
| 2007/0028098 A1 | 2/2007 | Baartman et al. | |
| 2007/0055602 A1 | 3/2007 | Mohn | |
| 2007/0169168 A1 | 7/2007 | Lim | |
| 2007/0282942 A1 | 12/2007 | Bailey et al. | |
| 2007/0283147 A1 | 12/2007 | Fried et al. | |
| 2008/0080718 A1 | 4/2008 | Meijer et al. | |
| 2008/0083036 A1 | 4/2008 | Ozzie et al. | |
| 2008/0089520 A1 | 4/2008 | Keszler | |
| 2008/0189250 A1 | 8/2008 | Cha et al. | |
| 2008/0313716 A1 | 12/2008 | Park | |
| 2009/0126007 A1 | 5/2009 | Zamberlan et al. | |
| 2009/0178102 A1 | 7/2009 | Alghathbar et al. | |
| 2009/0205018 A1 | 8/2009 | Ferraiolo et al. | |
| 2009/0240728 A1 | 9/2009 | Shukla et al. | |
| 2009/0265753 A1 | 10/2009 | Anderson et al. | |
| 2009/0320093 A1 | 12/2009 | Glazier et al. | |
| 2010/0145714 A1 | 6/2010 | Elmore et al. | |
| 2010/0306818 A1 | 12/2010 | Li et al. | |
| 2011/0040793 A1 | 2/2011 | Davidson et al. | |
| 2011/0053555 A1 | 3/2011 | Cai et al. | |
| 2011/0112939 A1 | 5/2011 | Nelson et al. | |
| 2011/0126207 A1 | 5/2011 | Wipfel et al. | |
| 2011/0131146 A1 | 6/2011 | Skutnik | |
| 2011/0138051 A1 | 6/2011 | Dawson et al. | |
| 2011/0307523 A1 | 12/2011 | Balani et al. | |
| 2011/0313902 A1 | 12/2011 | Liu et al. | |
| 2011/0314466 A1 | 12/2011 | Berg et al. | |
| 2012/0005341 A1 | 1/2012 | Seago et al. | |
| 2012/0131194 A1 | 5/2012 | Morgan | |
| 2012/0136936 A1 | 5/2012 | Quintuna | |
| 2012/0221454 A1 | 8/2012 | Morgan | |
| 2012/0226796 A1 | 9/2012 | Morgan | |
| 2012/0226808 A1 | 9/2012 | Morgan | |
| 2012/0297441 A1 | 11/2012 | Boldyrev et al. | |
| 2012/0304191 A1 | 11/2012 | Morgan | |
| 2012/0311154 A1 | 12/2012 | Morgan | |
| 2013/0047230 A1 | 2/2013 | Krishnan et al. | |
| 2013/0086060 A1 | 4/2013 | Donley et al. | |
| 2013/0086065 A1 | 4/2013 | Sharma et al. | |
| 2013/0086210 A1 | 4/2013 | Yiu et al. | |
| 2013/0086211 A1 | 4/2013 | Sondhi et al. | |
| 2013/0086628 A1 | 4/2013 | Kottahachchi et al. | |
| 2013/0086639 A1 | 4/2013 | Sondhi et al. | |
| 2013/0086658 A1 | 4/2013 | Kottahachchi et al. | |
| 2013/0086669 A1 | 4/2013 | Sondhi et al. | |
| 2013/0204994 A1 | 8/2013 | Deshmukh et al. | |
| 2013/0212160 A1 | 8/2013 | Lawson et al. | |
| 2013/0212420 A1 | 8/2013 | Lawson et al. | |
| 2013/0254882 A1 | 9/2013 | Kannappan et al. | |
| 2013/0268480 A1 | 10/2013 | Dorman | |
| 2013/0268491 A1 | 10/2013 | Chung et al. | |
| 2013/0275509 A1 | 10/2013 | Micucci et al. | |
| 2013/0290710 A1 | 10/2013 | Broder et al. | |
| 2013/0298212 A1 | 11/2013 | Shah et al. | |
| 2013/0332984 A1 | 12/2013 | Sastry et al. | |
| 2013/0332985 A1 | 12/2013 | Sastry et al. | |
| 2014/0020054 A1 | 1/2014 | Lim | |
| 2014/0059002 A1 | 2/2014 | Lockhart et al. | |
| 2014/0074539 A1 | 3/2014 | Doering et al. | |
| 2014/0074540 A1 | 3/2014 | Evans et al. | |
| 2014/0074544 A1 | 3/2014 | Seetharam et al. | |
| 2014/0074659 A1 | 3/2014 | Chatterjee et al. | |
| 2014/0074788 A1 | 3/2014 | Chatterjee et al. | |
| 2014/0074793 A1 | 3/2014 | Doering et al. | |
| 2014/0074999 A1 | 3/2014 | Khalsa et al. | |
| 2014/0075016 A1 | 3/2014 | Chatterjee et al. | |
| 2014/0075027 A1 | 3/2014 | Chatterjee et al. | |
| 2014/0075031 A1 | 3/2014 | Doering et al. | |
| 2014/0075032 A1 | 3/2014 | Vasudevan et al. | |
| 2014/0075033 A1 | 3/2014 | Doering et al. | |
| 2014/0075034 A1 | 3/2014 | Vasudevan et al. | |
| 2014/0075239 A1 | 3/2014 | Prathipati et al. | |
| 2014/0075499 A1 | 3/2014 | Arun et al. | |
| 2014/0075565 A1 | 3/2014 | Srinivasan et al. | |
| 2014/0141743 A1 | 5/2014 | Shaw | |
| 2014/0143083 A1 | 5/2014 | Prathipati et al. | |
| 2014/0280943 A1 | 9/2014 | Bobrov et al. | |

FOREIGN PATENT DOCUMENTS

| | | |
|---|---|---|
| WO | 2014039882 | 3/2014 |
| WO | 2014039918 | 3/2014 |
| WO | 2014039919 | 3/2014 |
| WO | 2014039921 | 3/2014 |

OTHER PUBLICATIONS

Oracle Internet Directory Administrator's Guide: Introduction to LDAP and Oracle Internet Directory, Oracle, 10g Release 2, B14082-02, Retrieved from the Internet: URL: http://docs.oracle.com/cd/B14099_19/idmanage.1012/b14082/intro.htm on Oct. 1, 2013, 1999, 9 pages.

XACML v3.0 Hierarchical Resource Profile Version 1.0, Oasis, Working Draft 7, Retrieved from the Internet: URL: http://xml.coverpages.org/XACML-v30-HierarchicalResourceProfile-WD7.pdf on Aug. 29, 2013, Apr. 1, 2009, 22 pages.

U.S. Appl. No. 13/485,372, Non-Final Office Action, mailed Feb. 28, 2013, 14 pages.

Anthony et al., "Consolidation Best Practices: Oracle Database 12c plugs you into the cloud", Oracle White Paper, Retrieved from the Internet: URL: http://www.oracle.com/us/products/database/database-private-cloud-wp-360048.pdf on Oct. 1, 2013, Jul. 2013, 30 pages.

Bierman et al., "Network Configuration Protocol (NETCONF) Access Control Model", Internet Engineering Task Force, RFC 6536, Retrieved from the Internet: URL: http://tools.ietf.org/html/rfc6536 on Aug. 29, 2013, Mar. 2012, 50 pages.

(56) References Cited

OTHER PUBLICATIONS

Chanliau et al., "Oracle Fusion Middleware Oracle Platform Security Services (OPSS) FAQ", Oracle, Retrieved for the Internet: URL: http://www.oracle.com/technetwork/testcontent/opss-faq-131489.pdf on Oct. 1, 2013, Jul. 2010, 6 pages.
Chiba et al., "Dynamic Authorization Extension to Remote Authentication Dial In User Service (RADIUS)", Network Working Group, RFC 5176, Retrieved from the Internet: URL: http://tools.ietf.org/html/rfc5176 on Aug. 29, 2013, Jan. 2008, 35 pages.
Clemm et al., "Web Distributed Authoring and Versioning (WebDAV) Access Control Protocol", Network Working Group, RFC 3744, Retrieved from the Internet: URL: http://www.ietf.org/rfc/rfc3744.txt on Aug. 29, 2013, May 2004, 66 pages.
Datta et al., "Oracle Fusion Middleware Developer's Guide for Oracle Identity Manager", Oracle, 11g Release 2, E27150-08, Retrieved from the Internet: URL: http://docs.oracle.com/cd/E37115_01/dev.1112/e27150/toc.htm on Oct. 1, 2013, Sep. 2013, 1102 pages.
International Patent Application No. PCT/US2013/058426, International Search Report and Written Opinion, mailed Nov. 8, 2013, 9 pages.
Subi et al., "Oracle Fusion Middleware Application Security Guide", Oracle, 11g Release 1, E10043-09, Retrieved from the Internet: URL: http://docs.oracle.com/cd/E21764_01/core.1111/e10043/underjps.htm on Oct. 1, 2013, May 2011, 834 pages.
Teger et al., "Oracle Fusion Middleware Developer's Guide for Oracle Access Management", Oracle, 11g Release 2, E27134-06, Retrieved from the Internet: URL: http://docs.oracle.com/cd/E37115_01/dev.1112/e27134/toc.htm on Oct. 1, 2013, Jul. 2013, 372 pages.
Teger, "Oracle Fusion Middleware Developer's Guide for Oracle Entitlements Server", Oracle, 11g Release 1, E27154-01, Retrieved from the Internet: URL: http://docs.oracle.com/cd/E27559_01/dev.1112/e27154/handle_auth_calls.htm on Oct. 1, 2013, Jul. 2013, 132 pages.
International Patent Application No. PCT/US2013/058639, International Search Report and Written Opinion, mailed Jan. 8, 2014, 10 pages.
International Patent Application No. PCT/US2013/058642, International Search Report and Written Opinion, mailed Feb. 7, 2014, 17 pages.
International Patent Application No. PCT/US2013/058638, International Search Report and Written Opinion, mailed Jan. 8, 2014, 11 pages.
International Patent Application No. PCT/US2013/058596, International Search Report and Written Opinion, mailed Nov. 22, 2013, 9 pages.
"Basic Traversals," The Neo4J Manual, Neo Technology, Inc. (copyright 2012) 7 pages.
"LDAP Authentication Overview," Juniper Networks, Inc. (copyright 1999-2010) 4 pages.
"Using ldapsearch," *Red Hat Directory Server 8.2 Administration Guide for managing Directory Server instances Edition 8.2.8*, Red Hat, Inc. (copyright 2010) 3 pages.
Afgan et al. "CloudMan as a Tool Execution Framework for the Cloud," IEEE Proceedings of The 35th International Convention on Information and Communication Technology, Electronics and Microelectronics (MIPRO 2012), pp. 437-441 (2012).
Bastos et al. "Towards a Cloud-Based Environment for Space Systems Concept Design," IEEE International Conference on Information Society (I-SOCIETY), pp. 478-483 (2012).
Hunter "LDAP Searching-Setting the SCOPE Parameters," available at http://www.idevelopment.info/data/LDAP/LDAP_Resources/SEARCH_Setting_the_SCOPE_Parameter.shtml (copyright 1998-2013) 2 pages.
Paul et al., "Architectures for the future networks and the next generation Internet: A survey," Computer Communications 34:2-42 (2011).
Demarest et al., Oracle Cloud Computing, An Oracle White Paper, Oracle Corporation, Redwood Shores, CA, May 2010, 22 pages.
U.S. Appl. No. 13/838,113, Non-Final Office Action mailed on Aug. 28, 2014, 14 pages.
U.S. Appl. No. 13/838,537, Non-Final Office Action mailed on Sep. 11, 2014, 22 pages.
U.S. Appl. No. 13/838,813, Non-Final Office Action mailed on Aug. 14, 2014, 22 pages.
International Application No. PCT/US2013/058426, Written Opinion mailed on Aug. 19, 2014, 7 pages.
International Application No. PCT/US2013/058596, Written Opinion mailed on Aug. 19, 2014, 6 pages.
International Application No. PCT/US2013/058642, Written Opinion mailed on Sep. 11, 2014, 8 pages.
U.S. Appl. No. 13/842,269, Non Final Office Action mailed on Jun. 5, 2014, 12 pages.
International Application No. PCT/US2013/058642, Invitation to restrict or pay additional fees mailed on Jul. 23, 2014, 3 pages.
International Application No. PCT/US2013/058426, International Preliminary Report on Patentability mailed on Dec. 5, 2014, 6 pages.
International Application No. PCT/US2013/058596, International Preliminary Report on Patentability mailed on Dec. 5, 2014, 6 pages.
U.S. Appl. No. 13/838,813, Final Office Action mailed on Dec. 4, 2014, 24 pages.
U.S. Appl. No. 13/840,943, Non-Final Office Action mailed on Dec. 18, 2014, 10 pages.
U.S. Appl. No. 13/842,269, Notice of Allowance mailed on Nov. 3, 2014, 8 pages.
U.S. Appl. No. 13/842,833, Notice of Allowance mailed on Dec. 15, 2014, 11 pages.
U.S. Appl. No. 13/907,689, Non-Final Office Action mailed on Jan. 7, 2015, 11 pages.

* cited by examiner

LDAP-BASED MULTI-TENANT IN-CLOUD IDENTITY MANAGEMENT SYSTEM

CLAIM OF PRIORITY AND CROSS-REFERENCE TO RELATED APPLICATIONS

The present Application claims priority under 35 U.S.C. §119(e) to U.S. Provisional Patent Application No. 61/801,048, filed Mar. 15, 2013, titled LDAP-BASED MULTI-TENANT IN-CLOUD IDENTITY MANAGEMENT SYSTEM, the entire contents of which are incorporated herein by reference for all purposes. The present Application claims priority under 35 U.S.C. §119(e) to U.S. Provisional Patent Application No. 61/698,463, filed Sep. 7, 2012, titled SHARED IDENTITY MANAGEMENT ARCHITECTURE, the entire contents of which are incorporated herein by reference for all purposes; U.S. Provisional Patent Application No. 61/698,413, filed Sep. 7, 2012, titled TENANT AUTOMATION SYSTEM, the entire contents of which are incorporated herein by reference for all purposes; U.S. Provisional Patent Application No. 61/698,459, filed Sep. 7, 2012, titled SERVICE DEPLOYMENT INFRASTRUCTURE; U.S. Provisional Patent Application No. 61/785,299, filed Mar. 14, 2013, titled CLOUD INFRASTRUCTURE, the entire contents of which are incorporated herein by reference for all purposes; and The present application claims priority as a continuation in part to U.S. patent application Ser. No. 13/838,813, filed Mar. 15, 2013, titled MULTI-TENANCY IDENTITY MANAGEMENT SYSTEM, the entire contents of which are incorporated herein by reference for all purposes.

BACKGROUND

The disclosure below relates generally to computer security, and more specifically to identity management within a cloud computing environment that is partitioned into various separate identity domains.

Cloud computing involves the use of computing resources (e.g., hardware and software) that are delivered as a service over a network (typically the Internet). Cloud computing entrusts remote services with a user's data, software, and computation. Cloud computing can be used to offer software as service (SaaS) or a platform as a service (PaaS), for example. In a business model using SaaS, users can be provided access to application software and databases. The cloud providers can manage the infrastructure and platforms on which the applications execute. SaaS providers generally price applications using a subscription fee. SaaS can allow a business the potential to reduce information technology operational costs by outsourcing hardware and software maintenance and support to the cloud provider. This outsourcing can enable the business to reallocate information technology operations costs away from hardware/software spending and personnel expenses, towards meeting other information technology goals. Furthermore, with applications hosted centrally, updates can be released without the need for users to install new software. However, because users' data are stored on the cloud provider's server, some organizations can be concerned about potential unauthorized access to that data.

End users can access cloud-based applications through a web browser or a light-weight desktop or mobile application. Meanwhile, the business software and users' data can be stored on servers at a location that is remote from that business and from those users. Cloud computing at least theoretically allows enterprises to deploy their applications more rapidly, with improved manageability and less maintenance. Cloud computing at least theoretically enables information technology managers to adjust resources more quickly to meet sometimes fluctuating and unpredictable business demands.

Identity management (IDM) is the task of controlling information about users of computer system. Such information can include information that authenticates the identities of such users. Such information can include information that describes which data those users are authorized to access. Such information can include information that describes which actions those users are authorized to perform relative to various system resources (e.g., files, directories, applications, communication ports, memory segments, etc.) IDM can also include the management of descriptive information about each user and about how and by whom that descriptive information can be accessed and modified.

Potentially, a cloud computing environment could include a separate IDM system, or separate instance of an IDM system, for each separate organization that used the cloud computing environment. However, such a scheme could be seen as being duplicative of effort and as being wasteful of computing resources.

SUMMARY

Certain embodiments of the invention involve an identity management (IDM) system that is implemented in a cloud computing environment and that is partitioned into multiple separate identity domains.

In an embodiment of the invention, a set of constructs all align together to create an abstraction of, or "tenant-sliced" view of, a single IDM system. This single IDM system can include multiple separate components or sub-systems. The IDM system can be shared among multiple independent and separate "tenants," or IDM system customers, so that the IDM system is more densely utilized. Thus, there is no need for a separate IDM system to be instantiated for each separate customer. The single IDM system can be configured such that, for each tenant of the IDM system, a virtual view of the IDM system that is specific to that tenant can be presented to that tenant's users. A single LDAP directory can store identities for entities for all tenants, in separate partitions or subtrees of the LDAP directory, each such partition or subtree being dedicated to a separate identity domain for a tenant. Components of the cloud computing environment ensure that LDAP entries within a particular subtree are accessible only to service instances that have been deployed to the identity domain that corresponds to that particular subtree.

Embodiments of the invention can use the concept of virtualization. Separate views of the IDM system can be virtualized within the single IDM system in a manner that is conceptually similar to the manner in which multiple separate virtual machines can be virtualized on a single host computing device. This virtualization can be achieved by configuring the IDM system in a specific manner. The IDM system can involve multiple separate layers, including upper layers and lower layers that are conceptually vertically stacked one on top of the other. The upper layers, at least, can be partitioned. In the IDM system, various different services (e.g., authentication and/or authorization services) can be associated with various different tenants of the IDM system. The IDM system can isolate each tenant so that each tenant is capable of interacting only with the IDM system "slice," or partition, that is dedicated to that tenant. Thus, the IDM system can enforce isolation between tenants.

DETAILED DESCRIPTION

In the following description, for the purposes of explanation, specific details are set forth in order to provide a thorough understanding of embodiments of the invention. However, it will be apparent that the invention may be practiced without these specific details. Appendix 1 attached hereto and incorporated by reference herein provides additional details pertaining to embodiments of the invention.

Figure 1:
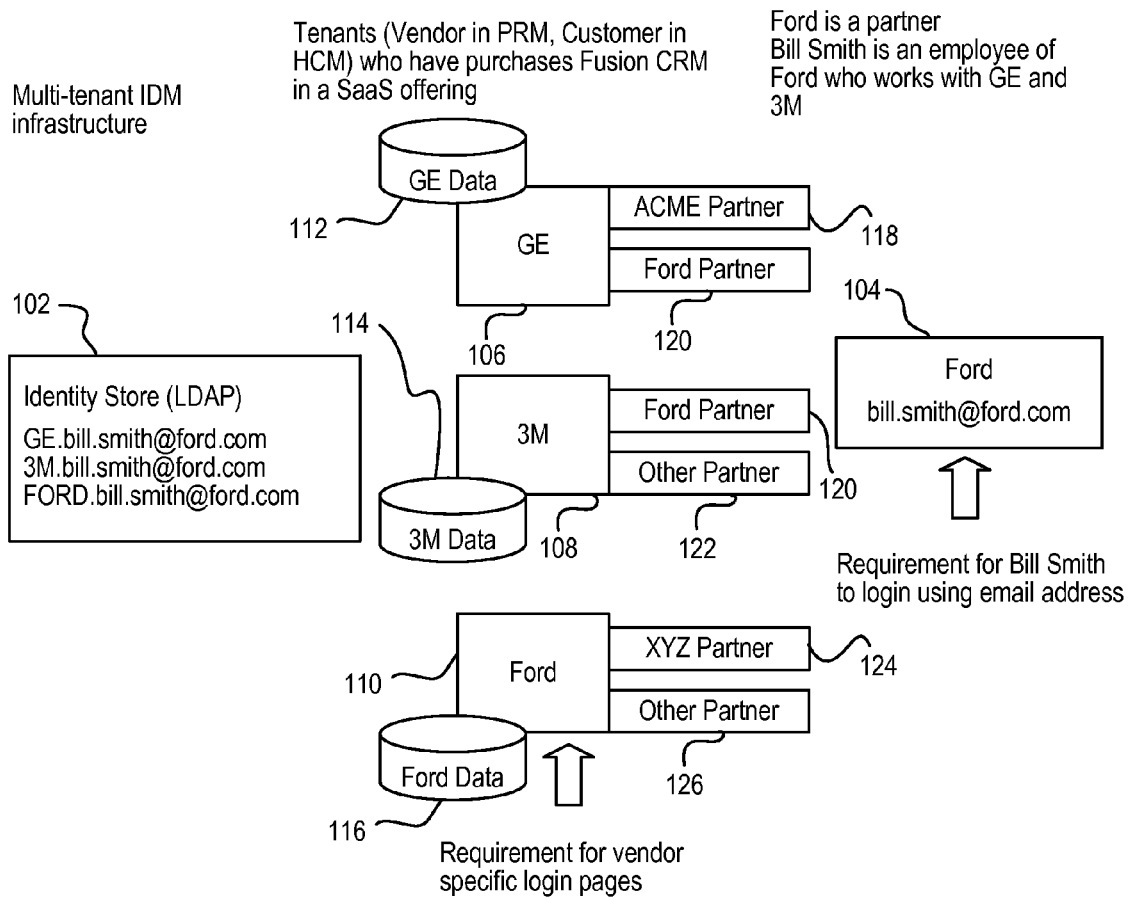
FIG. 1 is a block diagram that illustrates an example of an LDAP identity store used in a multi-tenant (or multi-identity domain) IDM system that is implemented in a cloud computing environment, according to an embodiment of the invention.

FIG. 1 is a block diagram that illustrates an example of an LDAP identity store used in a multi-tenant (or multi-identity domain) IDM system that is implemented in a cloud computing environment, according to an embodiment of the invention. Identity store 102 can be implemented as an LDAP directory. Oracle Internet Directory (OID) is an example of such an LDAP directory. Within identity store 102, various user identities recognized within various identity domains can be stored. Within identity store 102, each fully qualified user identity can be prefixed by an identity domain identifier. An example user Bill Smith having an identity within identity store 102 domain might have an e-mail address 104 such as "bill.smith@ford.com" that is not fully qualified. In an embodiment, the IDM system can ask a user to supply his e-mail address 104 when that user attempts to log-in to an identity domain managed by the IDM system. In an embodiment, the user can attempt to log-in to an identity domain through a log-in web page whose URL is specific to that identity domain and no other. The IDM system can then prefix the identity domain identifier for that identity domain (known from the log-in web page) onto the e-mail address in order to form the user's fully qualified user identity.

According to an embodiment, different customers can establish different identity domains within the IDM system. For example, as shown in FIG. 1, a customer GE can establish a GE identity domain 106, while a customer 3M can establish a 3M identity domain 108, while a customer Ford can establish a Ford identity domain 110. Each of these identity domains 106-110 can have a separate log-in web page that is specific to that identity domain. Such a log-in web page can be presented to a user when that user attempt to log-in to the corresponding identity domain. The log-in web page can include a field for an e-mail address 104 and a password.

After a user successfully logs into a particular identity domain, the IDM system can provide that user with a credential that is associated with the particular identity domain (and no other identity domain) and that can be presented to authorization units that protect resources within the IDM system. According to an embodiment, an authorization unit that protects a resource belonging to a particular identity domain will only permit the user to access that resource if the authorization unit determines that the credential is associated with the particular identity domain. Such protected resources can include customer data. For example, in FIG. 1, GE identity domain 106 can include GE data 112, while 3M identity domain 108 can include 3M data 114, while a Ford identity domain 110 can include Ford data 116.

As is discussed above, various customers can establish separate identity domains within the IDM system. Typically, these customers pay some subscription fee in order to establish such identity domains. However, in an embodiment, IDM system can also recognize business partners of these customers who are not necessarily customers themselves, and who do not necessarily have identity domains within the IDM system. In an embodiment, each identity domain can be associated with one or more partners who might or might not also have identity domains in the IDM system. For example, as shown in FIG. 1, GE identity domain 106 can be associated with an ACME partner 118 and a Ford partner 120. A partner, whether or not a customer of the IDM system, can have a partner identifier that uniquely identifies that partner within the IDM system and allows that same partner to be associated with multiple different identity domains. Continuing the previous example, 3M identity domain 108 can be associated with Ford partner 120 (also associated with GE identity domain 106) and another partner 122. A partner identifier can be associated with, or can be the same as, an identity domain identifier if the partner to whom that partner identifier pertains is also a customer (i.e., has established an identity domain). Continuing the previous example, Ford identity domain 110 (potentially having an identifier that is linked to the partner identifier of Ford partner 120) can be associated with an XYZ partner identifier 124 and another partner identifier 126.

In an embodiment, each identity domain of a customer who subscribes to PaaS or SaaS hosted in the cloud computing environment is associated with a unique identity domain identifier. Such an identity domain identifier can be unique within the cloud computing environment. The identity domain identifier can be generated using an algorithm that generates unique identifiers. In an embodiment, an identity domain identifier is associated with each item of data and metadata that belong to the identity domain identified by that identity domain identifier. In an embodiment, access control policies that are used to protect resources that belong to an identity domain are also associated with the identity domain identifier for that identity domain.

The identity domain identifier can be used in order to make each identity domain a virtual private environment for the customer who established that identity domain. The identity domain identifier can be used directly or indirectly to isolate, by identity domain, objects that are contained in repositories maintained within the cloud computing environment, even if such repositories are shared among multiple identity domains. Such isolation can be achieved, for example, through striping or partitions established within shared physical storage devices that make up the repositories; each stripe or partition can be associated with the identity domain identifier of the identity domain to which the objects contained in that stripe or partition belong. Different isolation mechanisms can be used relative to different types of such repositories. For example, if the repository is an LDAP directory, then LDAP entries containing data for objects can be prefixed with identity domain identifiers for the identity domains to which those objects belong. In a policy repository, policies pertaining to those objects can be prefixed with such identity domain identifiers as well. For another example, if the repository contains relational database management system (RDBMS) schemas, then an identity domain identifier can be used as an artifact for virtual private database (VPD) partitioning.

As is discussed above in connection with FIG. 1, identity store 102 can be implemented as an LDAP directory. Entries within the LDAP directory can be specific to identity domains. Attributes useful for enabling Single Sign-On (SSO) functionality between separate service instances within an identity domain can be specified in the LDAP entries. Such attributes can include a user name, a logon ID, and other identifiers that can be constrained to be unique within identity store 102.

In an embodiment, a user name that is not fully qualified is not required to be unique within the entire cloud computing environment, but can be required to be unique within a particular identity domain. Thus, the e-mail address "bill.smith@ford.com" can exist as a not fully qualified user name in multiple identity domains, but in an embodiment cannot exist multiple times within the same identity domain. In FIG. 1, identity store 102 is shown as containing multiple fully qualified user identities containing the same e-mail address "bill.smith@ford.com": "GE.bill.smith@ford.com" is a fully qualified user identity recognized within GE identity domain 106, while "3M.bill.smith@ford.com" is a fully qualified user identity recognized within 3M identity domain 108, while "FORD.bill.smith@ford.com" is a fully qualified user identity recognized within Ford identity domain 110. Thus, a fully qualified user identity can take the form of <identity domain identifier>.<e-mail address>. In one embodiment, users' e-mail addresses are stored within the "uid" attributes of LDAP entries in identity store 102.

In an embodiment, an LDAP schema can specify attributes and object classes. Attributes that the LDAP schema can specify can include, for example, (a) a globally unique ID (GUID) for an identity domain, (b) a name of an identity domain, (c) a service instance identifier, (d) a name of a service instance, and (e) a service instance type (e.g., JAVA service instance, database service instance, fusion application instance, etc.). Object classes that the LDAP schema can specify can include, for example, (a) an object class that can be used to identify system identifiers, (b) an object class that can be used to identity system identifier groups, (c) an object class that can be used to identify a CSR administrator, and (d) an object class that can be used to define a cloud service type (e.g., JAVA service, database service, etc.).

In an embodiment, an LDAP schema can specify various different groups of properties for various different types of entities. Entities for which the LDAP schema can specify properties can include, for example, (a) an identity domain entry, (b) a user entry, (c) a group entry, (d) a system identifier, (e) an identity domain administrator, and (f) a service instance administrator.

The LDAP schema can specify, for an identity domain entry, properties including (a) an identity domain name, (b) a globally unique identity domain identifier, and (c) an identity domain state. The identity domain name can be a text value that represents a name of the identity domain as chosen by a customer who established the identity domain. The identity domain name can be prefixed onto a user's e-mail address in order to generate the fully qualified user identifier for that user. The globally unique identity domain identifier can be an automatically generated GUID. This GUID can represent a data stripe for the identity domain within a database. Alternatively, this GUID can be used to partition other forms of shared repositories so as to isolate one identity domain's data from every other identity domain's data within that shared repository, thereby organizing identity domains data into, e.g., separate IDM policy domains, separate LDAP subtrees, separate file system folders, etc. The identity domain state can maintain a state of an identity domain, such as, for example, whether the identity domain is currently within a trial period.

The LDAP schema can specify, for a user entry, properties including (a) a common name, (b) a non-qualified user name, (c) a directory unique identifier for the user, (d) a GUID for the user, and (e) an identity domain identifier of the identity domain to which the user belongs. The common name can be specified by the customer who established the identity domain, and is a standard LDAP attribute. The non-qualified user name can be the user name that the user enters into a user name field when logging into an identity domain from a web page specific to that identity domain. For example, this user name can be the user's e-mail address. The directory unique identifier uniquely identifies the user entry in the directory. For example, as is discussed above, the directory unique identifier can take the form <identity domain identifier>.<e-mail address>. The GUID can be an automatically generated identifier that is placed in all LDAP entries that refer to the user having the user entry's directory unique identifier. As will be seen in the discussion below, the directory unique identifier for a user entry can be used as a unique identifier within many different components of a multiple identity domain system, including Oracle Access Manager (OAM) and Oracle Identity Manager (OIM).

The LDAP schema can specify, for a group entry, properties including (a) a common name, (b) a directory unique identifier for the group, (c) a GUID for the group, and (d) an identity domain identifier of the identity domain to which the user belongs. The common name can be specified by the customer who established the identity domain, and is a standard LDAP attribute. The directory unique identifier uniquely identifies the group entry in the directory. The directory unique identifier can take the form <identity domain identifier>.<common name>. The GUID can be an automatically generated identifier that is placed in all LDAP entries that refer to the group having the group entry's directory unique identifier.

In an embodiment, the LDAP schema can specify system identifiers that represent special types of users. An object class specifically for system users can identify these special types of users. The attributes for these special types of users can be the same as for those discussed above in connection with user entries.

In an embodiment, the LDAP schema can specify system accounts for identity domain administrators and service instance administrators. These can be special accounts for administering and managing identity domains and service instances. An identity domain administrator entry can be a member of an identity domain administrator group. The identity domain administrator's identity can take the form <identity domain identifier>.<identity domain administrator name>. A service can have one or more instances within an identity domain. Each of these service instances can have a separate service instance administrator.

Figure 2:
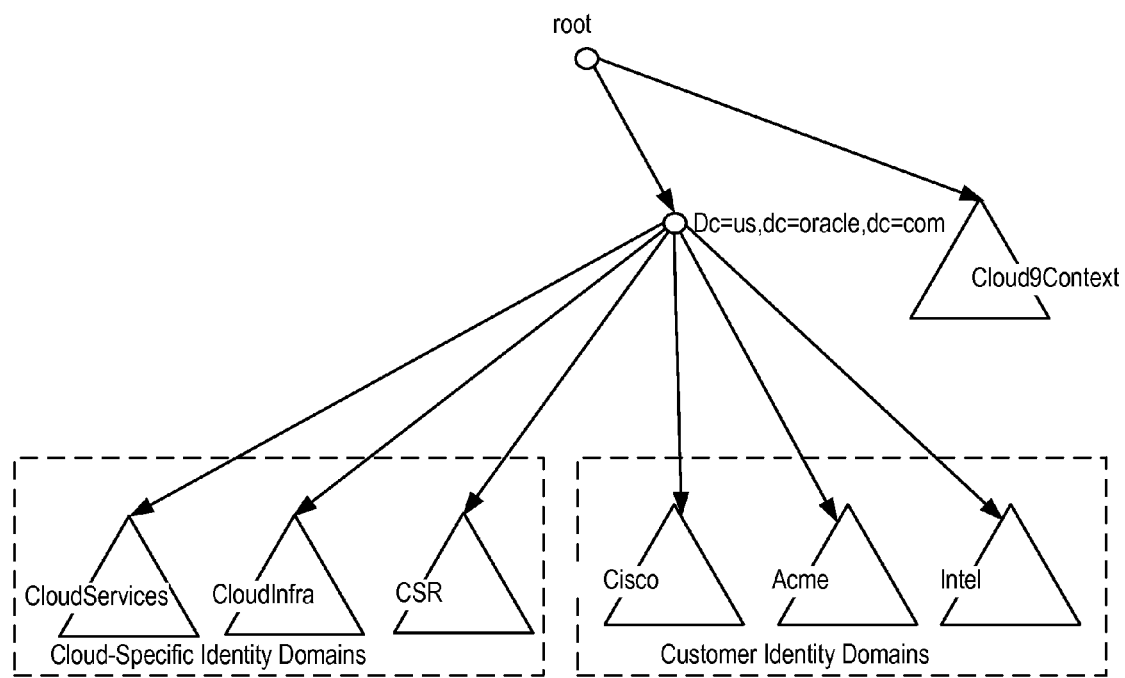
FIG. 2 shows an example of a subtree structure into which an LDAP directory can be organized, according to an embodiment of the invention.

The LDAP directory can be structured as a tree including multiple subtrees devoted to specific purposes. FIG. 2 shows an example of a subtree structure into which an LDAP directory can be organized, according to an embodiment of the invention. The tree can include users containers and groups containers. These containers can be out-of-the-box containers in Oracle Internet Directory. Hierarchically beneath these containers in the tree, application identity user containers and application identity group containers can be created. These latter containers can be created as a part of the fusion application provisioning process.

A system identifier subtree can contain all of the system identifiers. Such system identifiers can be used to manage systems in the cloud computing environment. System identifiers can be identified by an object class that is dedicated to such system identifiers. This object class makes it easier to identify system user identities and makes it possible to apply different policies to system user identities than those applied to other kinds of user identities. The system user identity's object class can be a subclass of the more general user's object class. In an embodiment, the system user identity's object class does not contain any attributes beyond those contained in its parent object class.

Figure 3:
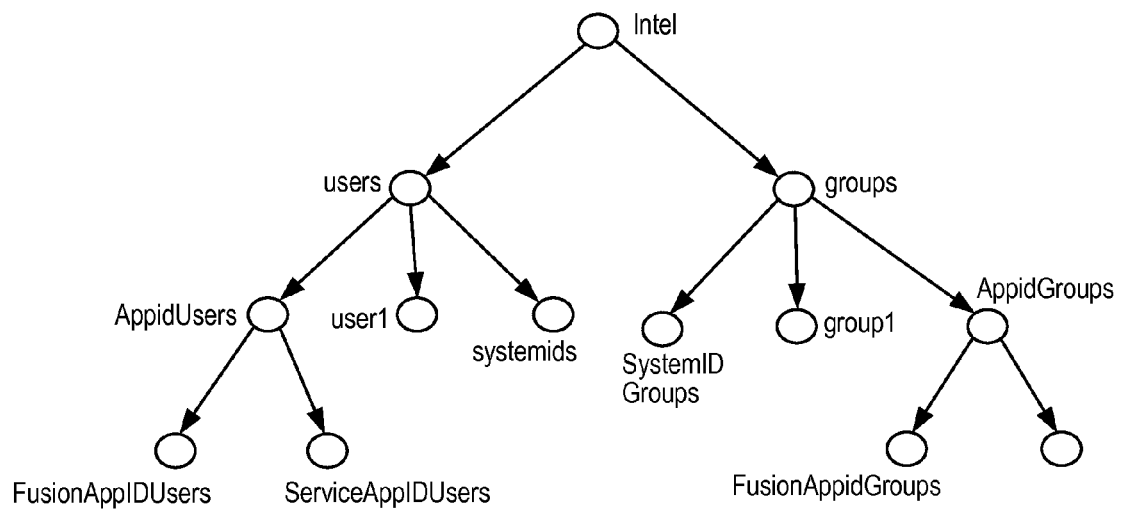
FIG. 3 shows an example of an identity domain subtree of the LDAP directory tree, according to an embodiment of the invention.

FIG. 3 shows an example of an identity domain subtree of the LDAP directory tree, according to an embodiment of the invention. This subtree can include the following artifacts: (a) a root node specifying the identity domain identifier of the identity domain (e.g., "Intel"), (b) a users container that can store identities of users belonging to the identity domain, and (c) a groups container that can store identities of groups belonging to the identity domain. The user container can contain identity domain administrator identifiers and identifiers of regular users in the identity domain environment. The groups container can contain group identifiers.

The identity domain subtree can include system identifier containers that can contain identities of users that can be used as proxy users for an authentication provider. Such proxy users can, in the case of fusion applications, have privileges to multi-language support attributes.

The identity domain subtree can include users containers that can contain objects that are instances of the user object class. Password policies relative to this subtree can be set to never expire. Oracle Access Manager policies can be applied to user identities in this subtree. Identity domain administrators in the identity domain administrator group for the identity domain have permissions to manage such user identities. Customer support representative in a customer support representative group also have permissions to manage such user identities.

The identity domain subtree can include groups containers for specific enterprise roles. The groups containers can contain objects that are instances of the group object class. Identity domain administrators in the identity domain administrator group for the identity domain have permissions to manage such group identities. Customer support representative in a customer support representative group also have permissions to manage such group identities.

The identity domain subtree can include application identity user containers that contain application identity user aliases. The identity domain subtree can include application identity group containers that contain application identity group aliases.

Figure 4:
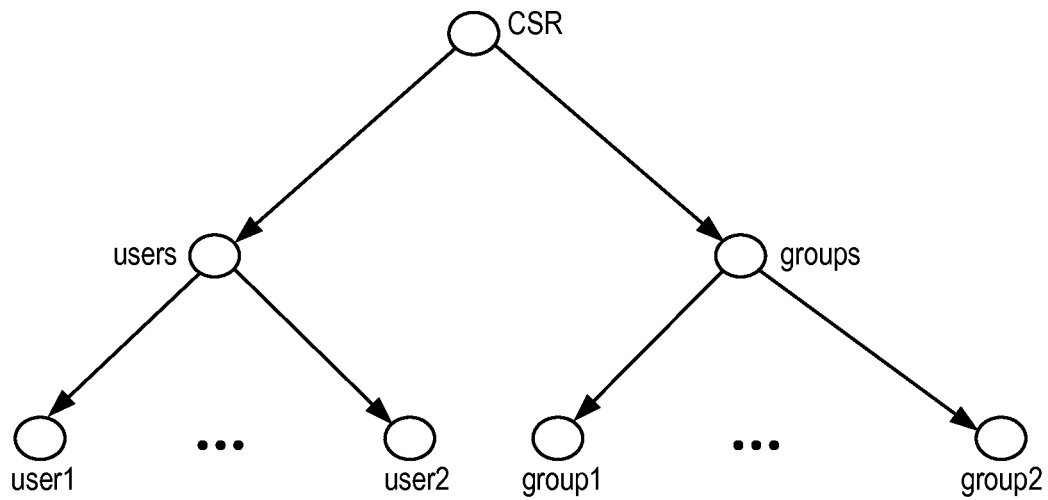
FIG. 4 shows an example of a customer support representative (CSR) subtree of the LDAP directory tree, according to an embodiment of the invention.

FIG. 4 shows an example of a customer support representative (CSR) subtree of the LDAP directory tree, according to an embodiment of the invention. This subtree can include a users subtree and a groups subtree. The users subtree can be a container for CSR user identities. The groups subtree can be a container for CSR group identities. In an embodiment, only users in an identity store administrator group are permitted to create users and groups in these subtrees.

Figure 5:
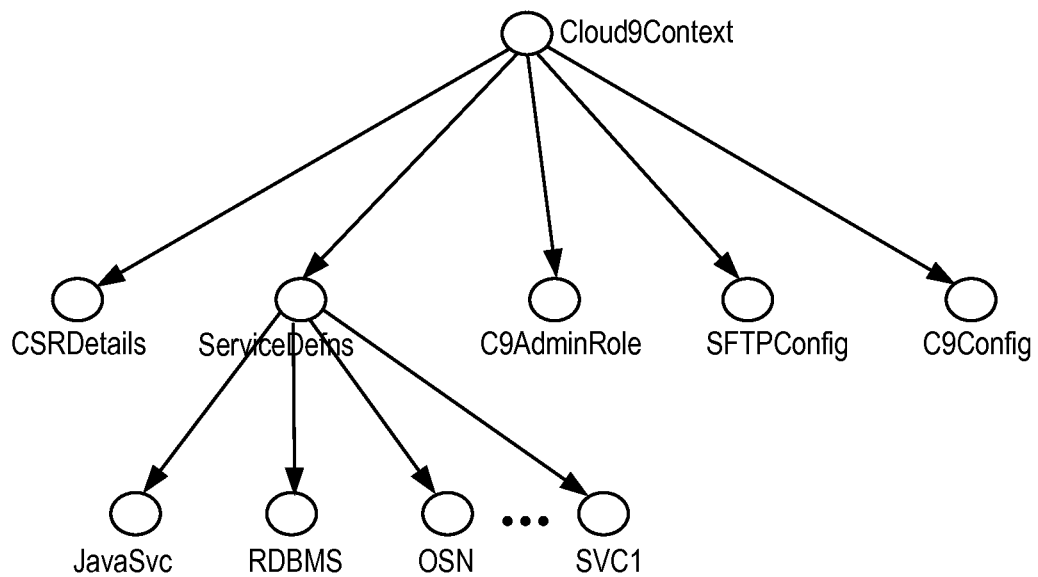
FIG. 5 shows an example of a Cloud9Context subtree of the LDAP directory tree, according to an embodiment of the invention.

FIG. 5 shows an example of a Cloud9Context subtree of the LDAP directory tree, according to an embodiment of the invention. This subtree can contain subtrees for service types, service definitions, and role templates for the service types. When a new service instance creation request is received in the IDM system, roles in the role templates subtree can be cloned into a container that is specific to an identity domain.

In an embodiment, the LDAP directory tree can include service nodes that define various service types supported in a PaaS environment. Such service types can include, for example, a JAVA service, an Apex service, and a web center service.

In an embodiment, the LDAP directory's entries can be accessed using Oracle Identity Governanct Framework (IGF) APIs and/or user/role (U/R) APIs. These APIs can include multi-tenant-specific methods. Some methods can be used to access user entries. To access a identity domain unique name, an idxuserrole.User.getTenantuniquename( ) method can be invoked. To access a identity domain unique identifier, an idxuserrole.User.getTenantuid( ) method can be invoked. Some methods can be used to access group entries. To access a identity domain unique name, an idxuserrole.Role.getTenantuniquename( ) method can be invoked. To access a identity domain unique identifier, an idxuserrole.Role.getTenantuid( ) method can be invoked. To access a identity domain globally unique identifier, an idxuserrole.Role.getTenantguid( ) method can be invoked. In an embodiment, applications can use certain constants defined as LDAP attributes, such as a user profile identity domain name, a user profile identity domain GUID, a user profile identity domain unique identifier, a role profile identity domain name, a role profile identity domain GUID, and a role profile identity domain unique identifier.

According to an embodiment of the invention, each service type (e.g., JAVA service, fusion application service, etc.) within the cloud computing environment is secured by the shared IDM system. Identity store 102 can store user identities that are known within the cloud computing environment. Identity store 102 can encapsulate the group memberships of these users. In an embodiment, Oracle Platform Security Services (OPSS) can provide security functionality for service instances. Such security functionality can include, for example, authorization, credential and key management, auditing, etc. Each service instance of any type can have its own composite OPSS security store on a per-instance basis. The security store can provide isolation to a service instance for all of that instance's security artifacts. Such artifacts can include those used to enforce authorization. Such artifacts can include those used to obtain and consume credentials to connect back-end systems. Such artifacts can include those used to obtain and consume keys and certificates to establish secure socket layers (SSL) connections and to encrypt data. Such artifacts can include those used to manage the auditing of functionality exposed through the service instance. This auditing can be used to answer questions regarding who did what and when relative to a particular service instance.

Within the cloud computing environment and the shared IDM, a security store can be persisted in an Oracle Internet Directory (OID) that is separate and different from the instance of identity store 102. A single OID can host security stores for multiple service instances in the cloud computing environment. In an embodiment, access to the security store can be controlled by a bind identity that mid-tier components of service instances can use to connect to the security store. The bind identity can be scoped by directory access control lists (ACLs) to that the bind identity has visibility only to the security store of the service instance to which that bind identity pertains. The bind identity can be maintained within its corresponding service instance as OPSS bootstrap information that is managed by OPSS.

Identity provisioning can take place within the cloud computing environment. Embodiments of the invention can use Service Provisioning Markup Language (SPML). In one embodiment, a fusion application instance might pass an identity domain GUID of "1" to the IDM system when making SPML calls. Under these circumstances, a shared IDM OID instance that processes the SPML request can derive the correct identity domain GUID and can process the request appropriately. In an alternative embodiment, separate identity domains can host separate fusion application instances. Under such circumstances, each fusion application instance can pass, to the shared IDM OID instance, a correct identity domain GUID (e.g., the identity domain GUID of the identity domain to which that fusion application instance belongs). Each fusion application instance can receive an appropriate identity domain GUID in a callback payload.

Figure 6:
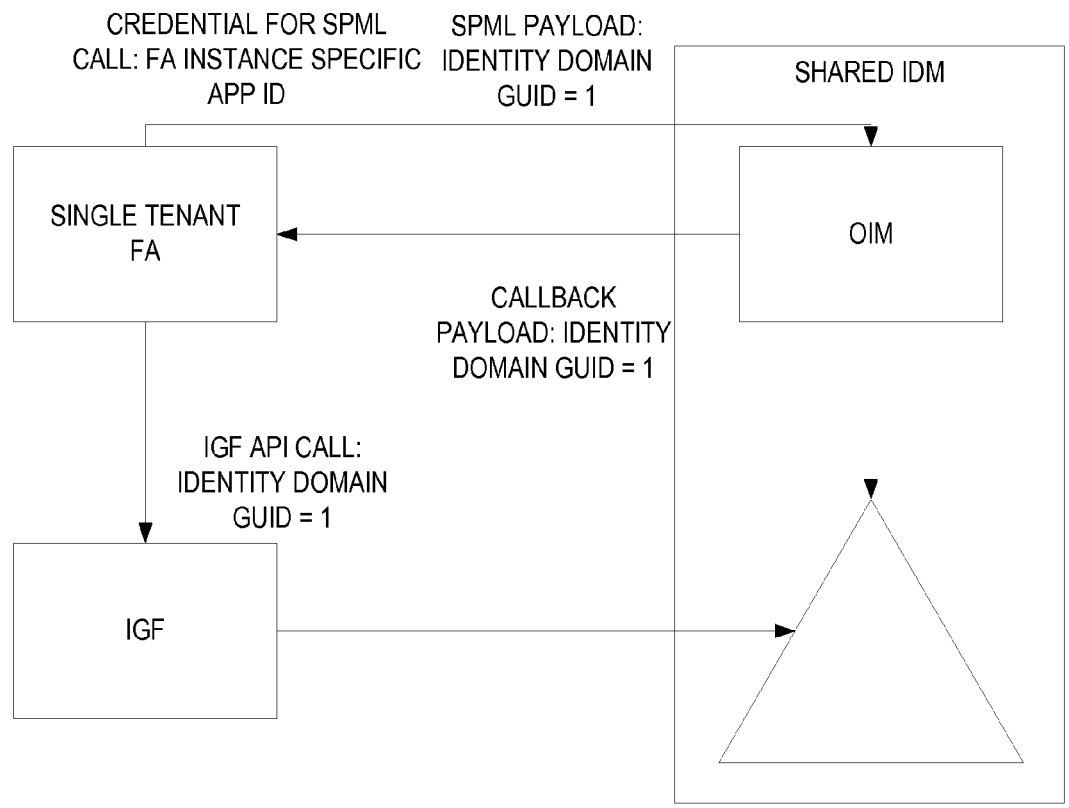
FIG. 6 shows an example of an interaction between a single-tenant (single identity domain) fusion application instance and components of a shared IDM system, including Oracle Identity Manager (OIM), according to an embodiment of the invention.

In one embodiment, each separate fusion application instance can use the same application identity credential to communicate with the shared IDM system. However, in an alternative embodiment, each deployed fusion application instance can have its own separate application identity credential that it can use when communicating with the shared IDM system. The shared IDM system can use such a fusion application instance deployment-specific application identity credential to derive the identity domain GUID of a fusion application instance that is communicating with the shared IDM system. FIG. 6 shows an example of an interaction between a single-tenant (single identity domain) fusion application instance and components of a shared IDM system, including Oracle Identity Manager (OIM), according to an embodiment of the invention.

A fusion application instance can use IGF for read operations and SPML for write operations. In one embodiment, if a fusion application instance passes an identity domain GUID of "1" to the shared IDM system, then an IGF layer can derive a correct identity domain GUID. According to one embodiment, both single-identity-domain clients and multi-identity-domain clients are expected by the shared IDM system to pass a correct identity domain GUID. In an alternative embodiment, the shared IDM system expects a single-identity-domain client to pass, as a parameter, an identity domain GUID value of "1". Under such circumstances, an IGF layer can use configuration settings, which can be set up during Oracle Virtual Machine (OVM) re-hydration, to obtain an appropriate identity domain GUID (e.g., the identity domain GUID of the identity domain to which that fusion application instance belongs).

In one embodiment, when an OIM module in a shared IDM system processes an SPML request to create a user identity, that OIM module can provide a fusion application instance with two pieces of user identification information: (a) a user login name and (b) a user GUID. An SPML attribute for the user login name can be called "username." In one embodiment, the value of the "username" attribute can be stored in the directory unique identity attribute of a user entry in the LDAP directory. The value can be stored in the format <identity domain name>.<uid>, where <uid> can be a value entered by the user in a login screen. This <uid> value can also be stored in a "uid" attribute in the LDAP directory. In an alternative embodiment, the "username" SPML attribute can be returned simply as <uid> without any identity domain name prefix. An SPML attribute for the user GUID can be called "user ID". The value of the "user ID" attribute can be the GUID of the user entity in the LDAP directory. This value can be passed to an OIM module as a "psoID" attribute in subsequent SPML calls from a fusion application instance to identify a user entity to be modified.

Components of the shared IDM system and applications executing within the shared IDM system can obtain access to information about an authenticated user. In one embodiment, a user identity can be made available within an authenticated subject principal. The authenticated subject principal name can be set by an Oracle Access Manager (OAM) asserter for all SSO authentication that is controlled by the OAM. The asserter can set this authenticated subject principal name to be the value in a directory unique identifier attribute of a user entry for the authenticated user in the LDAP directory. As is discussed above, this value can be encoded in the format <identity domain name>.<uid>. In one embodiment, non-SSO authentication, such as that involving web service calls, also can follow the foregoing approach.

In an alternative embodiment, the user identity can be made available as a tuple of two attributes, a "uid" and an identity domain GUID. The authenticated subject principal name can be set to the "uid" value. The "uid" value can be a user login name that is unique within an identity domain. The identity domain GUID value can be made available in an identifier context that is associated with the authenticated subject. The OPSS infrastructure can ensure that both "uid" and the identity domain GUID (in the identifier context) are made available to containers via identity propagation. Single-identity-domain clients can use the authenticated subject principal to get access to the authenticated user identity. These clients can obtain the "uid" value without any identity domain-related prefixing. Thus, in an embodiment, single-identity-domain clients do not need to parse or reconstruct the "uid" because the "uid" represents the unique value within the identity domain. In one embodiment, multi-identity-domain clients can use both the "uid" in the authenticated subject principal and the identity domain GUID in the identifier context to identify an authenticated user.

In one embodiment of the invention, an enterprise identifier can be added to each AppleCore table. Seed data can be delivered as a part of an installation, with an enterprise identifier of "1". When a new identity domain for a customer is provisioned in the IDM system, all of the rows associated with an enterprise identifier of "1" can be copied to rows associated with an enterprise identity that is specific to that customer. AppleCore can make use of a mapping table that contains mappings between user identifiers and enterprise identifiers/customers. Such mappings alternatively can be represented within an LDAP directory. When a user logs in, such mapping information can be used to establish the enterprise identifier for an AppleCore session. Each database connection used by applications can obtain the enterprise identifier context using FND_GLOBAL. A virtual private database (VPD) policy can be applied to each AppleCore table. Each such policy can contain a "where" clause that effectively restricts access to entities having an enterprise identifier that is equal to FND_GLOBAL.enterprise_ID. Rows inserted into each such table can include enterprise identifiers that are set to FND_GLOBAL.enterprise_ID.

In one embodiment of the invention, the enterprise identifier of an underlying AppleCore session can remain as the shared IDM system. OIM can provision the user identities contained in the LDAP directory. In a multiple identity domain environment, the relative distinguished name (RDN) attribute of each user entry can be the directory unique identity attribute for that user entry. The RDN construction rules used by OIM can be altered to cause the RDN attribute of each user entry to assume the value of the directory unique identity attribute. In an embodiment, each entry in the LDAP directory can be reconciled with the OIM database. Inasmuch as the login attribute can be the directory unique identity attribute for the user entry, a corresponding mapping can be reflected in an LDAPSync configuration in a multiple identity domain environment. Multi-tenancy enablement in OIM can involve configuration of LDAP container rules. Such LDAP container rules for existing identity domains can be configured at least in part by configuring a fusion middleware metadata services repository file "/dc/LDAPContainerRules.xml." For example, given two identity domains having GUID values of 49431843829924000 and 49431843829925000, the LDAP container rules can be configured as shown in TABLE 1:

TABLE 1

EXAMPLE LDAP CONTAINER RULE CONFIGURATION

| 49431843829924000 | user container | cn = users, identitydomainGUID = 49431843829924000, dc = oracle, dc = com |
| | group container | cn = groups, identitydomainGUID = 49431843829924000, dc = oracle, dc = com |
| 49431843829925000 | user container | cn = users, identitydomainGUID = 49431843829925000, dc = oracle, dc = com |
| | group container | cn = groups, identitydomainGUID = 49431843829925000, dc = oracle, dc = com | existing end user identifier when an application identifier context switch is executed. The VPD policies that are associated with a user's identity domain consequently can remain in scope. As a result, while the elevated data privileges and functional privileges can reflect those of the application identifier, the data privileges in scope can apply within the scope of the user's enterprise or identity domain VPD stripe.

According to an embodiment of the invention, multi-tenancy (i.e., multiple identity domains) can be enabled in Oracle Access Manager (OAM). To enable multiple identity domains in OAM, the OAM login process can be extended to accept an identity domain name as one of the attributes used to log in.

According to an embodiment of the invention, multi-tenancy (i.e., multiple identity domains) can be enabled in Oracle Identity Manager (OIM). To enable multiple identity domains in OIM, identity domain-related attributes contained within provisioning interfaces such as SPML requests and callbacks can be supported. Rules can be specified for constructing the directory unique identity attribute of a user entry in the LDAP directory so that this attribute has a unique value in that LDAP directory. In one embodiment, an e-mail address can be configured to be the unique attribute for a user in OIM. In an alternative embodiment, the directory unique identity attribute of a user entry in the LDAP directory can be used as the unique attribute for a user in OIM. In OIM, system properties such as OIM.EmailUniqueCheck and MTEntitySeparator can be configured to reflect this user of the directory unique identity attribute of the user entry. As a part of configuring a user/role provisioning subsystem, identity domain attributes such as the identity domain GUID and the identity domain name can be stored in a database for the OIM. These attributes can be configured to be user-defined fields in the In an embodiment of the invention, the process of provisioning a new identity domain within the shared IDM system can involve (a) the creation of an identity domain subtree for the identity domain in the LDAP directory and (b) the creation of other equivalent artifacts in OAM and OIM components. OPSS policies can be affected by such provisioning. OPSS policies can reflect an application role-to-enterprise role association. A customer's enterprise roles that originate externally to the shared IDM system can be cloned in the LDAP directory (e.g., OID) of the shared IDM system. As part of this cloning, associated application role mappings can be established by performing the following operations: (1) find the original system-jazn-data.xml file for each of the applications; (2) modify the enterprise roles in the extracted system-jazn-data.xml file to have the new identity domain's identity domain name prefix, to reflect the new identity domain-specific roles; and (3) treat the modified file as a new system-jazn-data.xml file and perform a migrateSecurityStore operation again with the destination of the operation set to be the Oracle Identity Directory (OID).

Domain-Based Directory Partitioning and Bind Credentials

In an embodiment of the invention, users associated with a particular identity domain (among potentially multiple separate identity domains) can use services that have been deployed to that particular identity domain—but not services that have been deployed to any other identity domain. In such an embodiment, the LDAP directory (e.g., OID) can function as an identity store for all of the identities in all of the multiple identity domains created within the cloud computing environment. There is no need to create separate LDAP directories in separate identity domains to serve as isolated identity stores for those identity domains; a single LDAP directory can serve all identity domains. In the LDAP directory, separate directory subtrees can be devoted to separate identity stores, such that, for example, all identities for a first identity domain can be stored within a first directory subtree, and all identities for a second identity domain can be stored within a second directory subtree. Both such subtree directories can have a common root.

Access to each subtree directory within the LDAP can be restricted to certain cloud computing system components. Some such components—such as cloud administrative components—can access all of the subtree directories, while other such components can access only certain specified subtree directories. For example, some components, such as services that have been deployed within a particular identity domain, can be restricted to access only the subtree directory that is dedicated to that particular identity domain. In an embodiment of the invention, this isolation between identity domains and their respective subtree directories can be enforced by mechanisms already available within LDAP directory systems. At the time that a service is deployed to a particular identity domain, the service deployment component of the cloud computing environment can generate a security credential specifically for that service. The security credential can be generated such that the credential, when inspected by the LDAP directory system, will cause the LDAP directory system to grant the service access only to the subtree directory that is associated with the particular identity domain into which the service has been deployed.

In an embodiment of the invention, the kinds of entities for which identities can be stored in the LDAP directory can be categorized into different types. One such type of entity is the user type. Identities of users who are associated with a particular identity domain can be stored in the LDAP directory subtree that is devoted to that particular identity domain. Another type of entity is the service instance type. Identities of service instances (so called because separate instances of the same service—such as a database service—can be deployed to separate identity domains) that have been deployed to a particular identity domain can be stored in the LDAP directory subtree that is devoted to that particular identity domain. In an embodiment of the invention, only service instance entities, and not user entities, have access to the LDAP server of the cloud computing environment. In such an embodiment, user entities are not exposed to the LDAP server, and are prevented from directly interacting with the LDAP server. In such an embodiment, user entities have no LDAP access privileges cannot directly access any information that is stored in the LDAP directory. In such an embodiment, only service instance entities have LDAP access privileges.

In an embodiment of the invention, entities that are of the service instance type, when provisioned to a particular identity domain by the provisioning mechanisms of the cloud computing environment, can be provisioned with "bind credentials" that are associated specifically with that particular identity domain and no other. Each bind credential can specify some limited scope of access, and different bind credentials can specify different scopes of access. These bind credentials can be generated and provided to the service instance type entities in response to and at the time of the deployment of those entities in the cloud computing environment. The bind credentials are used by components internal to the cloud computing environment and are not revealed to external entities. In an embodiment, no human user ever receives a bind credential.

Entities existing in a network can have identities that are recognized by the LDAP server. Such entities can include service instances. In an embodiment, although users are prevented from directly accessing information in the LDAP directory, in such an embodiment, the service instances can access that information on behalf of those users. The information that the service instances access from the LDAP directory can be about the users themselves. In an embodiment, only entities that are within the cloud computing environment's network have access to the cloud computing environment's LDAP system; components external to the network have no such access. In an embodiment, the LDAP server is configured to deny access to all entities that do not have a bind credential of the kind described above. Entities external to the network cannot obtain such bind credentials and therefore cannot obtain access to the LDAP directory. In an embodiment, this configuration is accomplished through access control policies to which the LDAP server adheres. Such access control policies are, in one embodiment, also stored in the LDAP directory.

As will be discussed further below, user names and passwords can sometimes be imported from the proprietary single-domain enterprise of a client (or "tenant") of the cloud computing environment for continued use in the client's identity domain created for that client in the cloud computing environment. The fact that these user names and passwords still exist in the client's own proprietary system can be viewed as something of a potential security vulnerability. However, even if the user names and passwords are somehow compromised within the client's proprietary single-domain enterprise, the fact that a potential system invader lacks a bind credential (because such credentials are, as discussed above, not supplied directly to users, but only to services that act on the behalf of those users) will protect the contents of the LDAP directory from such a potential invader. In an embodiment, service identifiers are separate from user identifiers in the LDAP directory, and the discovery of a user identifier will not reveal any service identifier.

In an embodiment of the invention, entities also can be classified based on whether those entities are (a) dedicated to a specific identity domain or (b) infrastructure components that are not dedicated to any specific identity domain. Infrastructure components can include a system provisioning component that is responsible for provisioning service instances to specific identity domains. Infrastructure components also can include an access management component, which can provide single sign-on (SSO) functionality for user entities relative to service instance entities. Infrastructure components can include identity management (IDM) components that manage identities that are stored in the LDAP directory. These infrastructure components can interact directly with the LDAP system for the purpose of authenticating and authorizing entities that interact with those infrastructure components.

As is discussed above, in an embodiment, entities that are dedicated to a particular identity domain are limited to accessing identities that are associated with that particular identity domain and no other. In an embodiment of the invention, this access limitation is achieved through the enforcement of access control policies that also can be contained within the LDAP directory. LDAP servers typically permit or deny access to information stored in an LDAP directory based on access control policies. Embodiments of the invention make use of this fact in order to cause the cloud computing environment's LDAP server to permit or deny access to certain identity domain-associated LDAP directory subtrees based on identity domain-specific access control policies.

Such identity domain-specific access control policies were not previously known or used in an LDAP system.

Multi-Tenant Unique Identifier

In an embodiment of the invention, each entity having an identity stored within the LDAP directory has a globally (across the entire LDAP directory and all of its subtrees) unique identity stored in the LDAP directory. This globally unique identity can be generated through the use of a canonically formatted prefix (for example) that is affixed to an identity that otherwise might not be globally unique, even if unique within a particular identity domain. In an embodiment, before users can interact with any services that are provided within the cloud-based environment, those users are required to log in to the environment. The log in procedure involves an authentication process. The log in name, or identity, that a user supplies to the authenticator might not be globally unique throughout the LDAP directory, even if it is unique within a particular identity domain. Therefore, in an embodiment, at the time that the user logs in to the environment, the authenticator requests, in addition to the user's log in name, the name of the identity domain to which the user desires access. In an alternative embodiment, the authenticator does not request the name of the identity domain from the user himself. Instead, each separate identity domain can be associated with a separate log in web page that is associated with a separate URL. The name of the identity domain can be contained within the code of the web page that a user needs to access to log into that identity domain. Thus, when the user directs his browser to access a particular URL for that domain-specific web page, the authenticator can determine the identity domain to which the user seeks access from the code of the web page itself.

In an embodiment of the invention, regardless of whether the user expressly supplies the name of the identity domain, an identifier of that identity domain is affixed to the user-supplied log in name in order to generate the globally unique identity for that user. This globally unique identifier can be called a multi-tenant unique identifier. In an embodiment, a particular user is always associated with the same multi-tenant unique identifier once his user account has been created, and that same multi-tenant unique identifier is used by the cloud environment's authentication system to authenticate the user every time that the user seeks access to a service within the environment. Because the multi-tenant unique identifier specifies the identity domain to which a user belongs, the LDAP server is able to determine which of the LDAP directory's subtrees are applicable to the user. The multi-tenant unique identifier is propagated between systems in the cloud environment, so the user cannot be confused with another user having the same name (but not the same identity domain) as another user. The fact that the multi-tenant unique identifier is being used by the cloud environment can be completely transparent to end users, who can supply their domain-unqualified log in names to the authentication subsystem. In an embodiment of the invention, an entity's multi-tenant unique identifier is generated for that entity in response to and at the time that a new record for that entity is created and added to the LDAP directory. The multi-tenant unique identifier can be propagated between subsystems of the cloud computing environment within message payloads. It is therefore unnecessary to rely upon the name of the LDAP directory subtree in which an entity's identity is located in order to determine the multi-tenant unique identifier for that entity.

In an embodiment of the invention, the multi-tenant unique identifier is one of several separate fields in the LDAP directory entry for the entity. The LDAP directory schema can be extended to include the multi-tenant unique identifier as an attribute. The multi-tenant unique identifier is separate in the LDAP directory entry from the user's log in name, so that the user's log in name, which might have been imported directly from a single-domain (single customer) system, can continue to be used without disruption or visible modification after the user's identity has been migrated from the single-domain system to the multi-domain cloud computing environment. Thus, in an embodiment, the same log in names that had been used within a particular cloud computing environment client's (or "tenant's") separate proprietary (usually non-cloud-based) enterprise can continue to be used within an identity domain created in the cloud computing environment and dedicated to that particular client. Indeed, during a migration process, these log in names can be directly uploaded from the client's proprietary enterprise into the cloud computing environment, at which time multi-tenant unique identifiers can be generated automatically for those log in names and stored within LDAP directory entries for the client's users.

Within typical LDAP directories, a distinguished name might be viewed as being a sort of globally unique identity. However, within typical LDAP directories, the distinguished name is typically a concatenation of multiple separate LDAP attribute values rather than the value of a single explicit LDAP attribute that is dedicated for the purpose of being a globally unique identity. If a client (tenant) of the cloud computing system needs to construct a globally unique identifier on his own for some reason, the client can be provided with the canonical rules that the system itself follows in constructing that globally unique identifier. For example, such rules can involve pre-pending a name of the client's identity domain to the user's log in name, delimited by a period. By following such rules, the multi-tenant unique identifier can be programmatically reconstructed with relative ease. The same qualities are not necessarily possessed by LDAP distinguished names.

It is possible that some applications or services executing within the cloud computing environment might not be configured to handle user identities that are prefixed with identity domain names. Under such circumstances, prior to the passing of the multi-tenant unique identifier to such an application or service, the identity domain name prefix can be stripped easily from the multi-tenant unique identifier so that the application or service receives only the user's unqualified log in name. The fact that the multi-tenant unique identifier is constructed according to a well-defined canonical format makes this potentially needed adjustment relatively simple to perform in an automated manner.

Some other applications or services executing within the cloud computing environment might be capable of recognizing identity domain names and behaving in variant ways depending on those identity domain names. Under such circumstances, the identity domain name can be parsed and extracted from the multi-tenant unique identifier for use by the application or service. The application or service can then determine which of the several identity domains it is to work with. Again, the fact that the multi-tenant unique identifier is constructed according to a well-defined canonical format makes this potentially beneficial extraction relatively simple to perform in an automated manner.

Cloud infrastructure components are among the services that can make use of identity domain names. These components can be multi-tenant (or multi-identity domain) capable. These components can receive requests pertaining to different users. In order to determine the identity domains to which the requests pertain, these components can simply and automatically parse the users' multi-tenant unique identifiers based on the canonical format to which those identifiers universally conform. Multi-tenant capable cloud infrastructure components can use data repositories that are striped per identity domain. Under such circumstances, these components can use the identity domain name, parsed from the multi-tenant unique identifier, as a handle to the stripe that is dedicated to the appropriate identity domain. The handle can be used to access the stripe.

Updating LDAP Directory when Provisioning Service Instances

In an embodiment of the invention, a provisioning service executing within the cloud computing environment performs all of the deployment of all service instances within the environment's various identity domains. The provisioning service has an application programming interface (API) for creating a service instance for a specified client (or "tenant") of the cloud computing environment. The provisioning service can create, or request from some other component, bind credentials with which to configure the service instance that is to be deployed. In an embodiment, the provisioning service uses the API to request, from another component, a bind credential for a specified service instance and a specified identity domain. Each bind credential can include a name and a password. The name can be automatically generated based on a standard convention, and can include both a name of the specified service instance and a name of the specified identity domain. The password can be randomly generated.

Concurrent with the generation of the bind credential, a new corresponding access policy can be automatically generated and added to the LDAP directory. The access policy specifies that the service instance having the name specified in the bind credential is only permitted to access the LDAP directory subtree that corresponds to the identity domain to which the service instance is being deployed. In an embodiment, the access policy further specifies that the service instance having that name is not permitted to modify identities in the LDAP directory; in an embodiment, only the identity management (IDM) subsystem of the cloud computing environment is permitted to modify such identities. The IDM subsystem itself is a service with which users of the cloud computing environment can interact. In an embodiment, the access policy further specifies that the service instance having the name specified in the bind credential is permitted only to read certain specified attributes of LDAP directory entries. The foregoing operations can be performed via the API discussed above. In an embodiment of the invention, no entities or components are given the ability to modify existing bind credentials.

Example Multi-Tenant LDAP System

Figure 9:
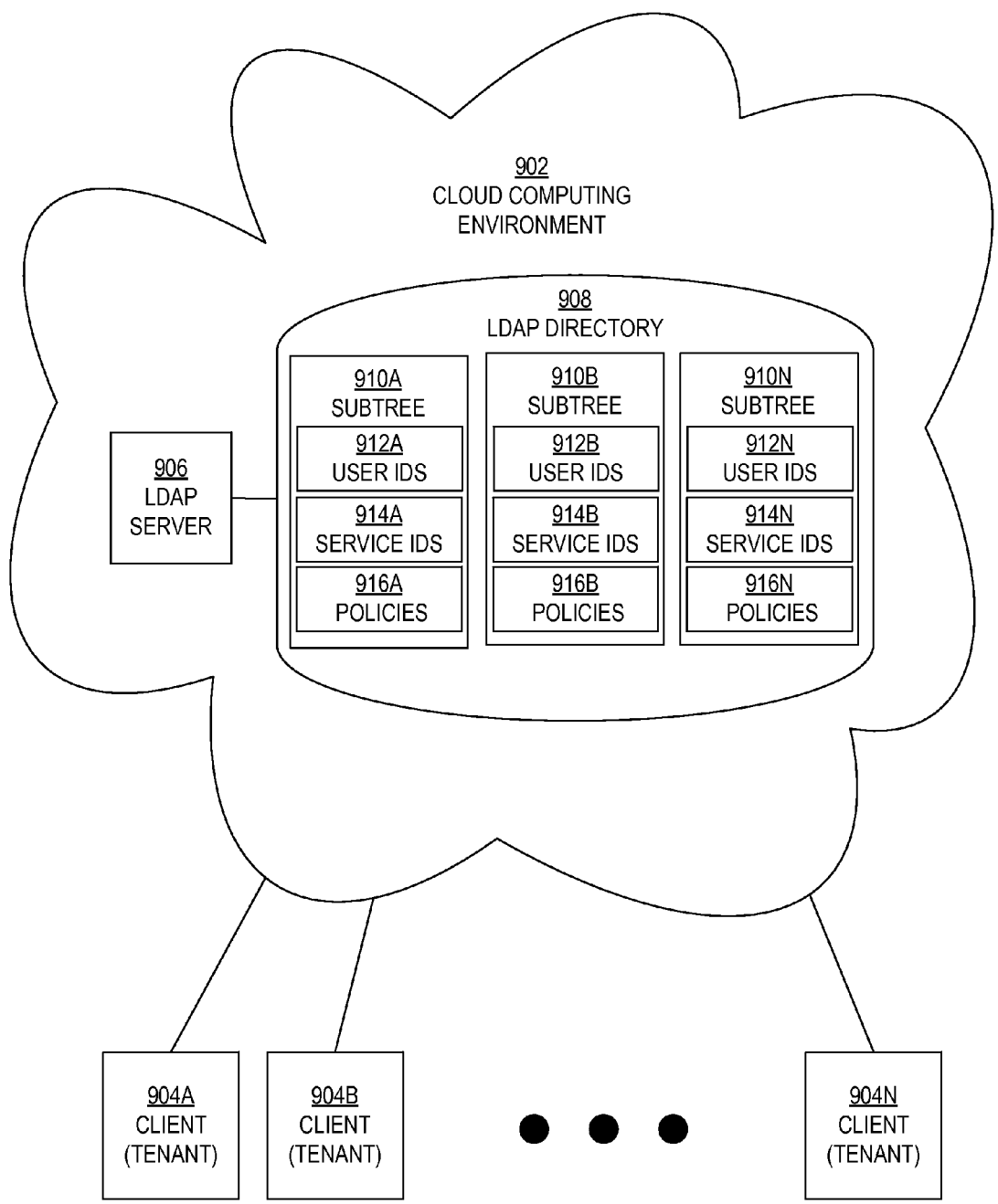
FIG. 9 is a block diagram that illustrates an example of a cloud computing environment that includes a multi-tenant LDAP system.

FIG. 9 is a block diagram that illustrates an example of a cloud computing environment that includes a multi-tenant LDAP system. Various embodiments of the invention can include additional, fewer, or different components than those expressly shown in FIG. 9. FIG. 9 shows a cloud computing environment 902 and clients (tenants) 904A-N. Each of clients (tenants) 904A-N can represent a separate organization, for example. Each of clients (tenants) 904A-N can have a separate identity domain defined within cloud computing environment 902 such that the identities and services contained within that identity domain are isolated from the identities and services in all other identity domains within cloud computing environment 902. Clients (tenants) 904A-N interact with components of cloud computing environment 902, typically through one or more networks, potentially including the Internet.

As shown in FIG. 9, cloud computing environment 902 contains an LDAP server 906 and an LDAP directory 908. Significantly, LDAP directory 908 is a single unified LDAP directory that contains LDAP entries for multiple separate identity domains—a separate identity domain for each of clients (tenants) 904A-N. For each such identity domain, LDAP directory 908 (which has a tree structure) contains a corresponding subtree dedicated specifically to that identity domain. For example, subtree 910A may be dedicated to the identity domain for client (tenant) 904A, while subtree 910B may be dedicated to the identity domain for client (tenant) 904B, and so on, while subtree 910N may be dedicated to the identity domain for client (tenant) 904N.

Each of subtrees 910A-N can contain LDAP entries for user identities, service instance identities, and access policies that pertain only to the identity domain to which that subtree corresponds. For example, subtree 910A contains user identities 912A, service instance identities 914A, and access policies 916A; while subtree 910B contains user identities 912B, service instance identities 914B, and access policies 916B; and so on, while subtree 910N contains user identities 912N, service instance identities 914N, and access policies 916N.

Example Techniques

Figure 10:
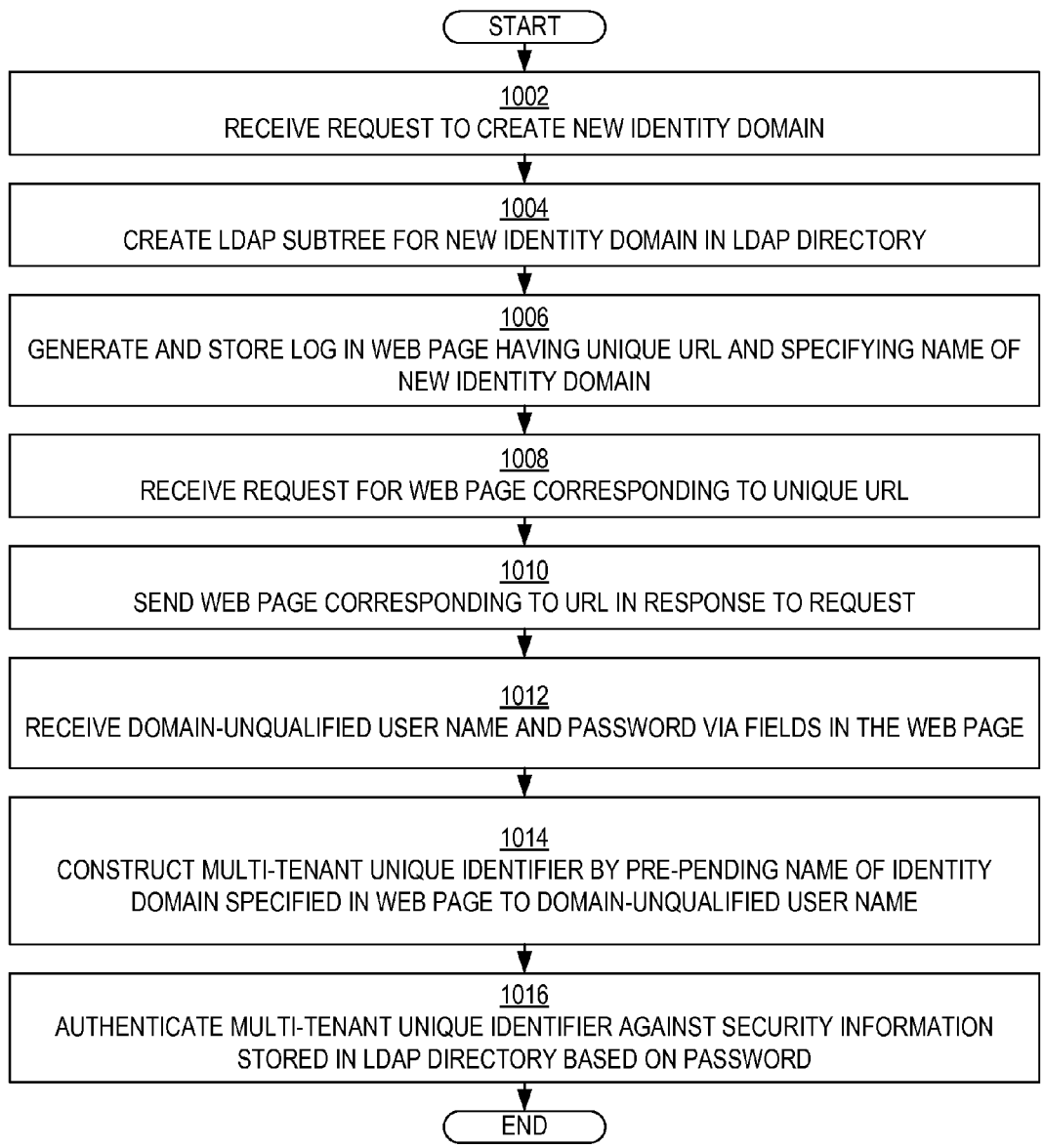
FIG. 10 is a flow diagram that illustrates an example of a technique for generating and using an identity domain-specifying log in web page for a particular identity domain, according to an embodiment of the invention.

FIG. 10 is a flow diagram that illustrates an example of a technique for generating and using an identity domain-specifying log in web page for a particular identity domain, according to an embodiment of the invention. In block 1002, a request is received to create a new identity domain. In block 1004, in response to the request, an LDAP subtree for the new identity domain is created in the LDAP directory. In block 1006, in response to the request, a log in web page having a unique URL and specifying the name of the new identity domain is generated and stored.

In block 1008, a request for the web page corresponding to the unique URL is received. In block 1010, the web page corresponding to the unique URL is sent in response to the request. In block 1012, a domain-unqualified user name and a password are received via a user name field and a password field of the web page. In block 1014, a multi-tenant unique identifier is constructed by pre-pending the name of the identity domain specified in the web page to the domain-unqualified user name. In block 1016, the multi-tenant unique identifier is authenticated against security information stored in the LDAP directory based on the supplied password.

Figure 11:
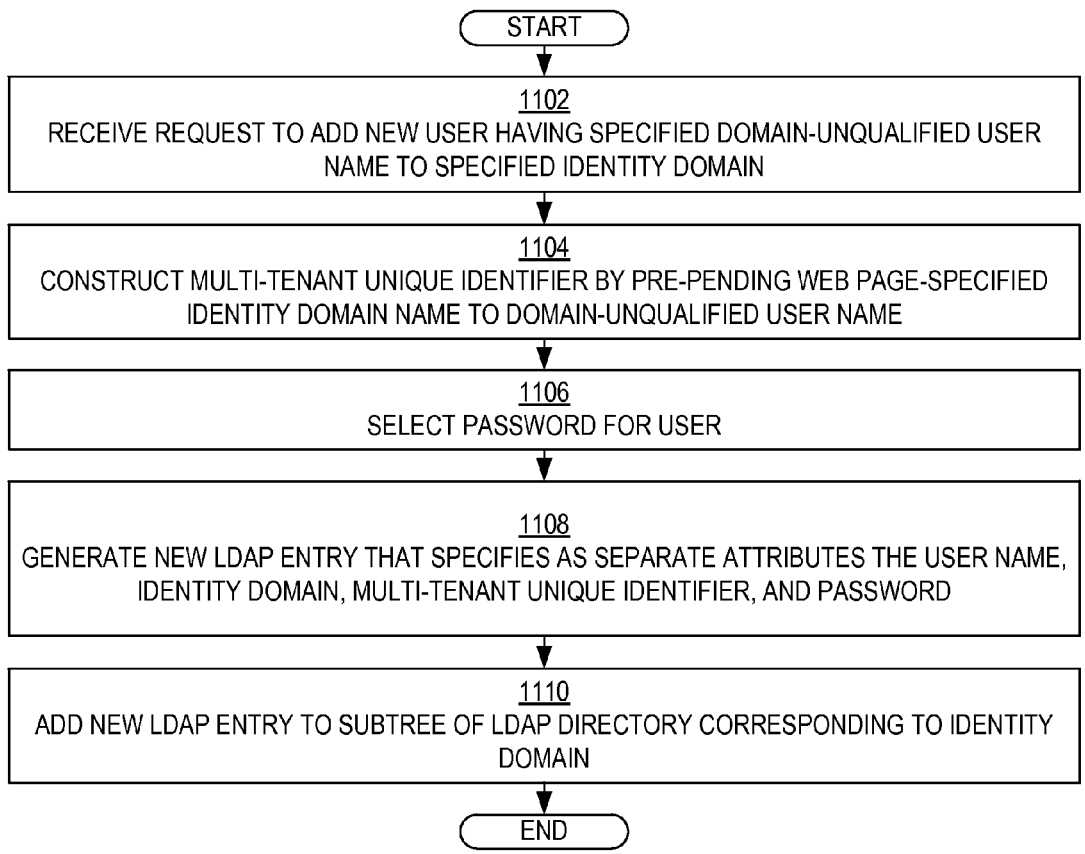
FIG. 11 is a flow diagram that illustrates an example of a technique for adding a new user identity to a particular identity domain, according to an embodiment of the invention.

FIG. 11 is a flow diagram that illustrates an example of a technique for adding a new user identity to a particular identity domain, according to an embodiment of the invention. In block 1102, a request is received to add a new user, having a specified domain-unqualified user name, to a specified identity domain. In block 1104, in response to the request, a multi-tenant unique identifier is constructed by pre-pending the name of the identity domain specified in the web page to the domain-unqualified user name. In block 1106, a password is selected for the new user. In block 1108, an new LDAP entry, which specifies as separate attributes the user name, the identity domain, the multi-tenant unique identifier, and the password, is generated. In block 1110, the new LDAP entry is added to a subtree of the LDAP directory that corresponds to the identity domain.

Figure 12:
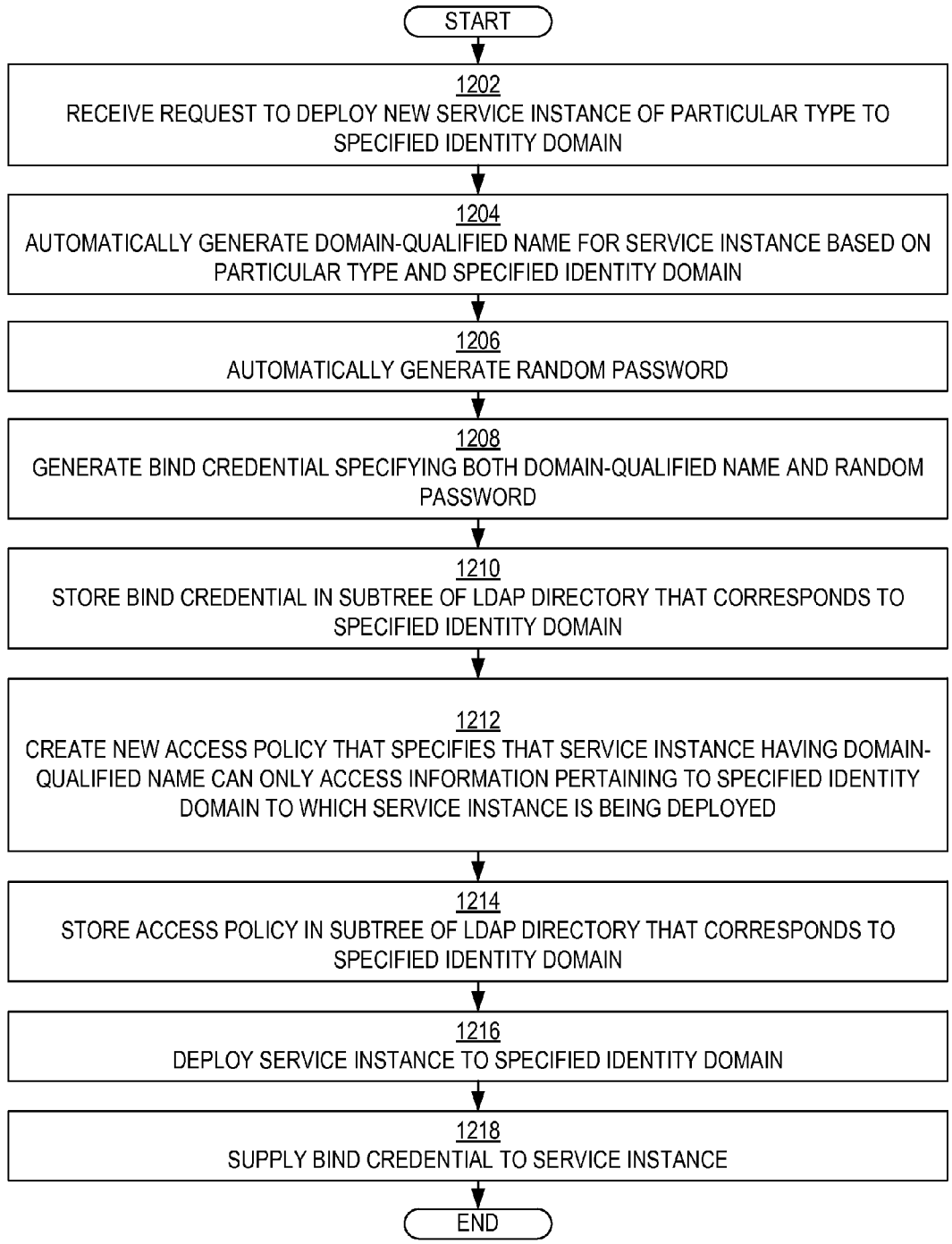
FIG. 12 is a flow diagram that illustrates an example of a technique for deploying a new service instance to a particular identity domain, according to an embodiment of the invention.

FIG. 12 is a flow diagram that illustrates an example of a technique for deploying a new service instance to a particular identity domain, according to an embodiment of the invention. In block 1202, a request is received to deploy a new service instance of a particular type to a specified identity domain. In block 1204, in response to the request, a domain-qualified name is automatically generated for the new service instance based on both the particular type and the specified identity domain. In block 1206, a random password is automatically generated. In block 1208, a bind credential, specifying both the domain-qualified name and the random password, is generated. In block 1210, the bind credential is stored in a subtree of the LDAP directory that corresponds to the specified identity domain.

In block 1212, a new access policy, which specifies that the service instance having the domain-qualified name (indicated in the bind credential) can only access information pertaining to the specified identity domain (that is, LDAP entries contained in the subtree of the LDAP directory that corresponds to the identity domain to which the service instance is being deployed), is created. In block 1214, the access policy is stored in the subtree of the LDAP directory that corresponds to the specified identity domain. In block 1216, the service instance is deployed in the specified identity domain. In block 1218, the bind credential is supplied to the service instance.

Figure 13:
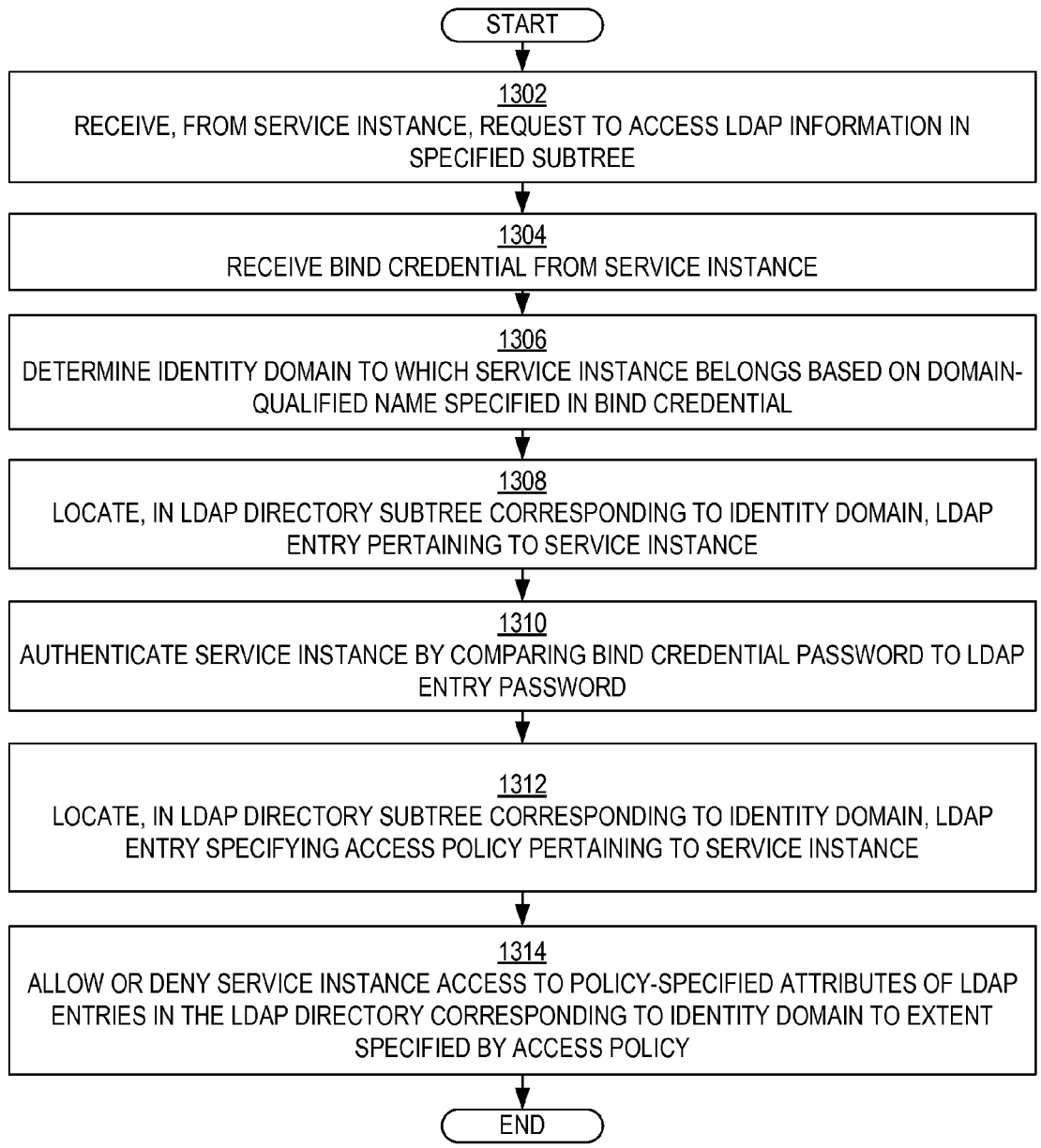
FIG. 13 is a flow diagram that illustrates an example of a technique for authenticating a service instance using a bind credential supplied to that service instance upon that service instance's deployment, according to an embodiment of the invention.

FIG. 13 is a flow diagram that illustrates an example of a technique for authenticating a service instance using a bind credential supplied to that service instance upon that service instance's deployment, according to an embodiment of the invention. In block 1302, an LDAP server receives, from a service instance, a request to access LDAP information in a specified subtree. In block 1304, the LDAP server receives a bind credential from the service instance. In block 1306, the LDAP server determines the identity domain to which the service instance belongs based on a domain-qualified name specified within the bind credential. In block 1308, the LDAP server locates, in the LDAP directory subtree corresponding to the determined identity domain, an LDAP entry pertaining to the service instance. In block 1310, the LDAP server authenticates the service instance by comparing a password specified in the bind credential to a password specified in the LDAP entry. In block 1312, the LDAP server locates, in the LDAP directory subtree corresponding to the determined identity domain, an LDAP entry specifying an access policy pertaining to the service instance. In block 1314, to the extent specified by the access policy, the LDAP server allows and/or denies, to the service instance, access to policy-specified attributes of LDAP entries in the LDAP directory subtree corresponding to the determined identity domain.

Hardware Overview

Figure 7:
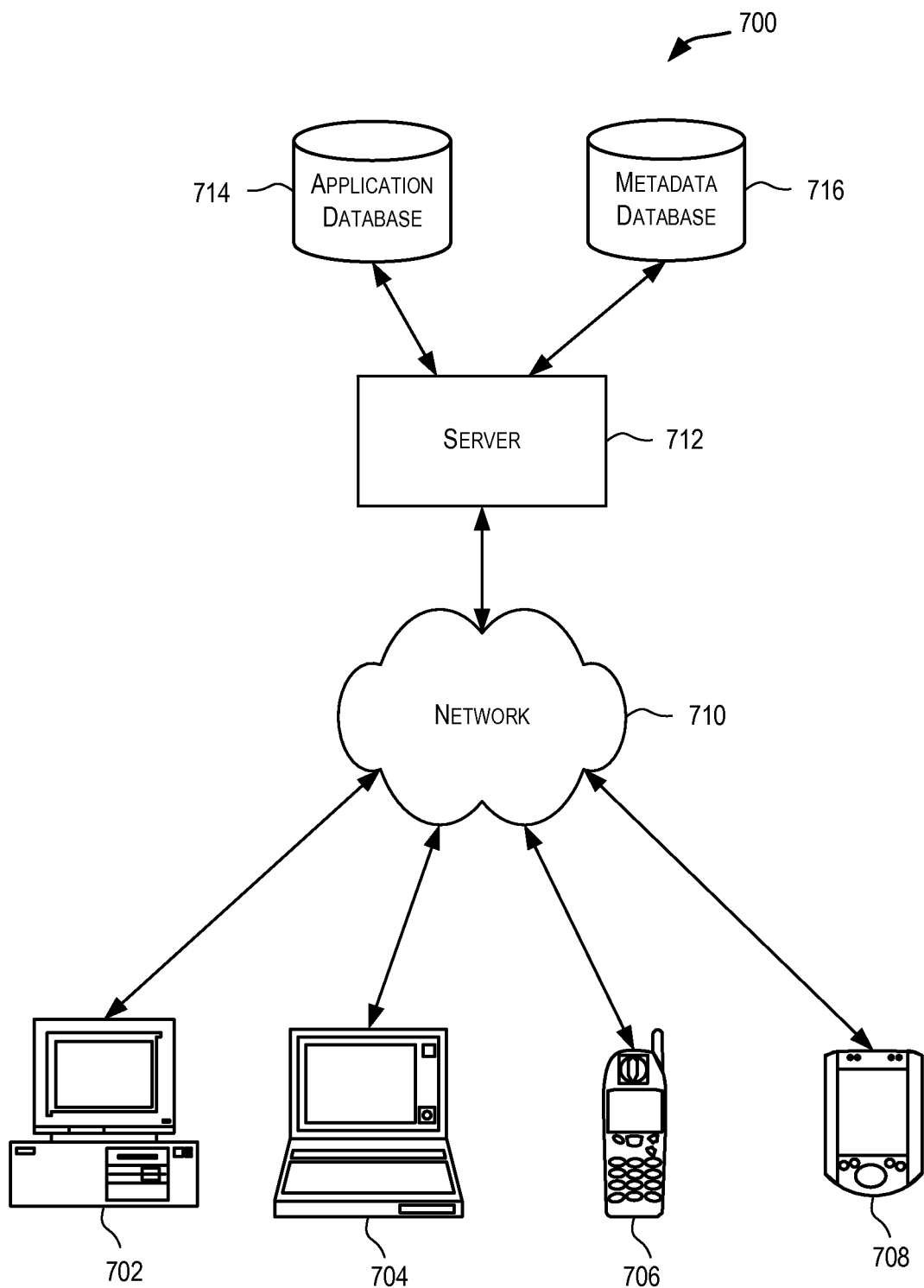
FIG. 7 is a simplified block diagram illustrating components of a system environment that may be used in accordance with an embodiment of the present invention.

FIG. 7 is a simplified block diagram illustrating components of a system environment 700 that may be used in accordance with an embodiment of the present invention. As shown, system environment 700 includes one or more client computing devices 702, 704, 706, 708, which are configured to operate client applications including native client applications and possibly other applications such as a web browser, or the like. In various embodiments, client computing devices 702, 704, 706, and 708 may interact with a server 712.

Client computing devices 702, 704, 706, 708 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 702, 704, 706, and 708 may be any other electronic device, such as a thin-client computer, Internet-enabled gaming system, and/or personal messaging device, capable of communicating over a network (e.g., network 710 described below). Although exemplary system environment 700 is shown with four client computing devices, any number of client computing devices may be supported. Other devices such as devices with sensors, etc. may interact with server 712.

System environment 700 may include a network 710. Network 710 may be any type of network familiar to those skilled in the art that can support data communications using any of a variety of commercially-available protocols, including without limitation TCP/IP, SNA, IPX, AppleTalk, and the like. Merely by way of example, network 710 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 700 also includes one or more server computers 712 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 712 may be adapted to run one or more services or software applications.

Server 712 may run an operating system including any of those discussed above, as well as any commercially available server operating system. Server 712 may also run any of a variety of additional server applications and/or mid-tier applications, including HTTP servers, FTP servers, CGI servers, JAVA servers, database servers, and the like. Exemplary database servers include without limitation those commercially available from Oracle, Microsoft, Sybase, IBM and the like.

System environment 700 may also include one or more databases 714, 716. Databases 714, 716 may reside in a variety of locations. By way of example, one or more of databases 714, 716 may reside on a non-transitory storage medium local to (and/or resident in) server 712. Alternatively, databases 714, 716 may be remote from server 712, and in communication with server 712 via a network-based or dedicated connection. In one set of embodiments, databases 714, 716 may reside in a storage-area network (SAN) familiar to those skilled in the art. Similarly, any necessary files for performing the functions attributed to server 712 may be stored locally on server 712 and/or remotely, as appropriate. In one set of embodiments, databases 714, 716 may include relational databases, such as databases provided by Oracle, that are adapted to store, update, and retrieve data in response to SQL-formatted commands.

Figure 8:
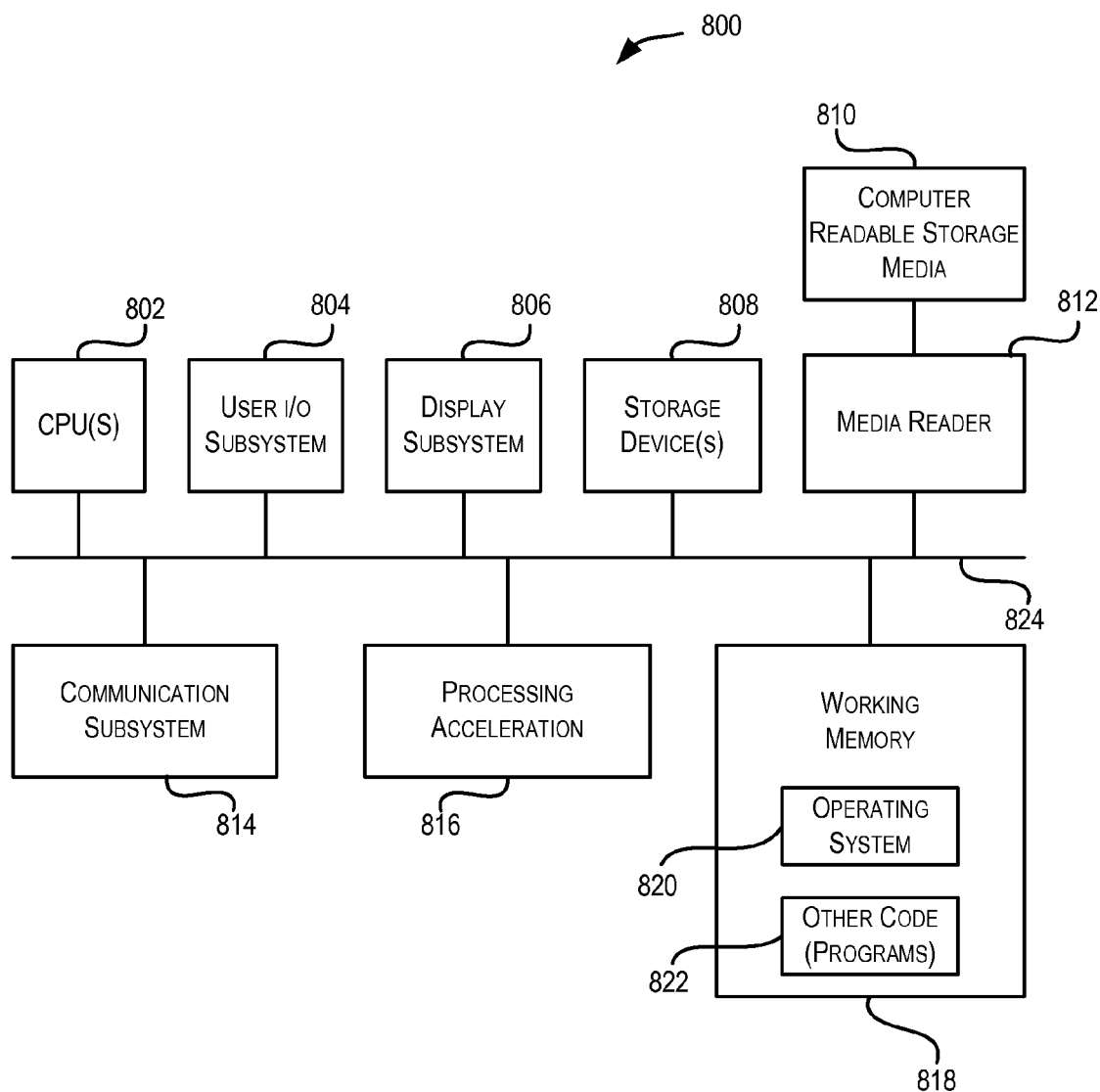
FIG. 8 is a simplified block diagram of a computer system that may be used in accordance with embodiments of the present invention.

FIG. 8 is a simplified block diagram of a computer system 800 that may be used in accordance with embodiments of the present invention. For example server 712 or clients 702, 704, 706, or 708 may be implemented using a system such as system 800. Computer system 800 is shown comprising hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). Computer system 800 may also include one or more storage devices 808. By way of example, the storage device(s) 808 may include devices such as disk drives, optical storage devices, and solid-state storage devices such as a random access memory (RAM) and/or a read-only memory (ROM), which can be programmable, flash-updateable and/or the like.

Computer system 800 may additionally include a computer-readable storage media reader 812, a communications subsystem 814 (e.g., a modem, a network card (wireless or wired), an infra-red communication device, etc.), and working memory 818, which may include RAM and ROM devices as described above. In some embodiments, computer system 800 may also include a processing acceleration unit 816, which can include a digital signal processor (DSP), a special-purpose processor, and/or the like.

Computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing computer-readable information. Communications system 814 may permit data to be exchanged with network 710 and/or any other computer described above with respect to system environment 700.

Computer system 800 may also comprise software elements, shown as being currently located within working memory 818, including an operating system 820 and/or other code 822, such as an application program (which may be a client application, Web browser, mid-tier application, RDBMS, etc.). In an exemplary embodiment, working memory 818 may include executable code and associated data structures used for a multi-tenant cloud-based IDM system as described above. It should be appreciated that alternative embodiments of computer system 800 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

What is claimed is:

1. A computer-implemented method comprising:
   storing, by a processor on a non-transitory computer-readable storage medium, in an LDAP directory having a root node, in a first directory subtree that descends from the root node, identities of entities that are associated with a first identity domain but not with a second identity domain;
   storing, by a processor on a non-transitory computer-readable storage medium, in the LDAP directory, in a second directory subtree that also descends from the root node but is a separate from the first directory subtree, identities that are associated with the second identity domain but not with the first identity domain;
   preventing service instances that have been deployed to the first identity domain from accessing identities that are stored in the second directory subtree; and
   preventing service instances that have been deployed to the second identity domain from accessing identities that are stored in the first directory subtree.

2. The computer-implemented method of claim 1, further comprising:
   storing, in the first directory subtree, identities of user entities that are associated with the first identity domain but not with the second identity domain;
   storing, in the first directory subtree, identities of service instance entities that are associated with the first identity domain but not with the second identity domain;
   preventing the user entities from interacting directly with an LDAP server that maintains the LDAP directory; and
   allowing the service instance entities to interact directly with the LDAP server on behalf of the user entities.

3. The computer-implemented method of claim 1, further comprising:
   in response to a deployment of a first service instance to the first identity domain but not to the second identity domain, generating a first credential which, when inspected by an LDAP server that maintains the LDAP directory, causes the LDAP server to permit the first service instance to access identities that are stored in the first directory subtree but not identities that are stored in the second directory subtree;
   providing the first credential to the first service instance;
   in response to a deployment of a second service instance to the second identity domain but not to the first identity domain, generating a second credential which, when inspected by the LDAP server, causes the LDAP server to permit the second service instance to access identities that are stored in the second directory subtree but not identities that are stored in the first directory subtree; and providing the second credential to the second service instance.

4. The computer-implemented method of claim 1, further comprising:
storing, in the LDAP directory, access control policies that specify various identity domains from a plurality of identity domains; and
controlling access to identity domain-associated subtrees of the LDAP directory based at least in part on the access control policies.

5. The computer-implemented method of claim 4, further comprising:
storing, in the LDAP directory, a first access control policy that specifies access restrictions that apply to the first directory subtree but not to the second directory subtree; and
storing, in the LDAP directory, a second access control policy that specifies access restrictions that apply to the second directory subtree but not to the first directory subtree.

6. The computer-implemented method of claim 1, further comprising:
generating a globally unique identifier for a first user by affixing an identifier of a first identity domain to a log in name of the first user;
storing the globally unique identifier for the first user in the first directory subtree;
generating a globally unique identifier for a second user by affixing an identifier of a second identity domain to a log in name of the second user; and
storing the globally unique identifier for the second user in the second directory subtree.

7. The computer-implemented method of claim 6, further comprising:
storing, in association with a first uniform resource locator (URL), a first log in web page that specifies an identifier of the first identity domain;
storing, in association with a second URL that differs from the first URL, a second log in web page that specifies an identifier of the second identity domain;
receiving, from a particular user, through a particular log in web page that is either the first log in web page or the second log in web page, a log in name of the particular user;
reconstructing a globally unique identifier for the particular user based on both (a) the log in name of the particular user and (b) a particular identity domain identifier that is specified by the particular log in web page; and
authenticating the particular user based on the globally unique identifier for the particular user.

8. The computer-implemented method of claim 1, further comprising:
in response to a deployment of a particular service instance to the first identity domain, automatically generating a bind credential that specifies both a name of the particular service instance and a randomly generated password; and
in response to the deployment of the particular service instance to the first identity domain, automatically adding, to the LDAP directory, a new access control policy that specifies that an entity having the name of the particular service instance can only access information pertaining to the identity domain to which the particular service instance is being deployed.

9. A computer-readable storage memory storing particular instructions capable of causing one or more processors to perform specified operations, the particular instructions comprising:
instructions to store, in an LDAP directory having a root node, in a first directory subtree that descends from the root node, identities of entities that are associated with a first identity domain but not with a second identity domain;
instructions to store, in the LDAP directory, in a second directory subtree that also descends from the root node but is separate from the first directory subtree, identities of entities that are associated with the second identity domain but not with the first identity domain;
instructions to prevent service instances that have been deployed to the first identity domain from accessing identities that are stored in the second directory subtree; and
instructions to prevent service instances that have been deployed to the second identity domain from accessing identities that are stored in the first directory subtree.

10. The computer-readable storage memory of claim 9, wherein the particular instructions further comprise:
instructions to store, in the first directory subtree, identities of user entities that are associated with the first identity domain but not with the second identity domain;
instructions to store, in the first directory subtree, identities of service instance entities that are associated with the first identity domain but not with the second identity domain;
instructions to prevent the user entities from interacting directly with an LDAP server that maintains the LDAP directory; and
instructions to allow the service instance entities to interact directly with the LDAP server on behalf of the user entities.

11. The computer-readable storage memory of claim 9, wherein the particular instructions further comprise:
instructions to generate, in response to a deployment of a first service instance to the first identity domain but not to the second identity domain, a first credential which, when inspected by an LDAP server that maintains the LDAP directory, causes the LDAP server to permit the first service instance to access identities that are stored in the first directory subtree but not identities that are stored in the second directory subtree;
instructions to provide the first credential to the first service instance;
instructions to generate, in response to a deployment of a second service instance to the second identity domain but not to the first identity domain, a second credential which, when inspected by the LDAP server, causes the LDAP server to permit the second service instance to access identities that are stored in the second directory subtree but not identities that are stored in the first directory subtree; and
instructions to provide the second credential to the second service instance.

12. The computer-readable storage memory of claim 9, wherein the particular instructions further comprise:
instructions to store, in the LDAP directory, access control policies that specify various identity domains from a plurality of identity domains; and
instructions to control access to identity domain-associated subtrees of the LDAP directory based at least in part on the access control policies.

13. The computer-readable storage memory of claim 12, wherein the particular instructions further comprise:
- instructions to store, in the LDAP directory, a first access control policy that specifies access restrictions that apply to the first directory subtree but not to the second directory subtree; and
- instructions to store, in the LDAP directory, a second access control policy that specifies access restrictions that apply to the second directory subtree but not to the first directory subtree.

14. The computer-readable storage memory of claim 9, wherein the particular instructions further comprise:
- instructions to generate a globally unique identifier for a first user by affixing an identifier of a first identity domain to a log in name of the first user;
- instructions to store the globally unique identifier for the first user in the first directory subtree;
- instructions to generate a globally unique identifier for a second user by affixing an identifier of a second identity domain to a log in name of the second user; and
- instructions to store the globally unique identifier for the second user in the second directory subtree.

15. The computer-readable storage memory of claim 14, wherein the particular instructions further comprise:
- instructions to store, in association with a first uniform resource locator (URL), a first log in web page that specifies an identifier of the first identity domain;
- instructions to store, in association with a second URL that differs from the first URL, a second log in web page that specifies an identifier of the second identity domain;
- instructions to receive, from a particular user, through a particular log in web page that is either the first log in web page or the second log in web page, a log in name of the particular user;
- instructions to reconstruct a globally unique identifier for the particular user based on both (a) the log in name of the particular user and (b) a particular identity domain identifier that is specified by the particular log in web page; and
- instructions to authenticate the particular user based on the globally unique identifier for the particular user.

16. The computer-readable storage memory of claim 9, wherein the particular instructions further comprise:
- instructions to automatically generate, in response to a deployment of a particular service instance to the first identity domain, a bind credential that specifies both a name of the particular service instance and a randomly generated password; and
- instructions to automatically add, to the LDAP directory, in response to the deployment of the particular service instance to the first identity domain, a new access control policy that specifies that an entity having the name of the particular service instance can only access information pertaining to the identity domain to which the particular service instance is being deployed.

17. A system comprising:
one or more processors; and
a computer-readable storage memory that stores particular instructions comprising:
- instructions to store, in an LDAP directory having a root node, in a first directory subtree that descends from the root node, identities of entities that are associated with a first identity domain but not with a second identity domain;
- instructions to store, in the LDAP directory, in a second directory subtree that also descends from the root node but is separate from the first directory subtree, identities of entities that are associated with the second identity domain but not with the first identity domain;
- instructions to prevent service instances that have been deployed to the first identity domain from accessing identities that are stored in the second directory subtree; and
- instructions to prevent service instances that have been deployed to the second identity domain from accessing identities that are stored in the first directory subtree.

18. The system of claim 17, wherein the particular instructions further comprise:
- instructions to generate, in response to a deployment of a first service instance to the first identity domain but not to the second identity domain, a first credential which, when inspected by an LDAP server that maintains the LDAP directory, causes the LDAP server to permit the first service instance to access identities that are stored in the first directory subtree but not identities that are stored in the second directory subtree;
- instructions to provide the first credential to the first service instance;
- instructions to generate, in response to a deployment of a second service instance to the second identity domain but not to the first identity domain, a second credential which, when inspected by the LDAP server, causes the LDAP server to permit the second service instance to access identities that are stored in the second directory subtree but not identities that are stored in the first directory subtree; and
- instructions to provide the second credential to the second service instance.

19. The system of claim 17, wherein the particular instructions further comprise:
- instructions to generate a globally unique identifier for a first user by affixing an identifier of a first identity domain to a log in name of the first user;
- instructions to store the globally unique identifier for the first user in the first directory subtree;
- instructions to generate a globally unique identifier for a second user by affixing an identifier of a second identity domain to a log in name of the second user;
- instructions to store the globally unique identifier for the second user in the second directory subtree;
- instructions to store, in association with a first uniform resource locator (URL), a first log in web page that specifies an identifier of the first identity domain;
- instructions to store, in association with a second URL that differs from the first URL, a second log in web page that specifies an identifier of the second identity domain;
- instructions to receive, from a particular user, through a particular log in web page that is either the first log in web page or the second log in web page, a log in name of the particular user;
- instructions to reconstruct a globally unique identifier for the particular user based on both (a) the log in name of the particular user and (b) a particular identity domain identifier that is specified by the particular log in web page; and
- instructions to authenticate the particular user based on the globally unique identifier for the particular user.

20. The system of claim 17, wherein the particular instructions further comprise:
- instructions to automatically generate, in response to a deployment of a particular service instance to the first identity domain, a bind credential that specifies both a name of the particular service instance and a randomly generated password; and instructions to automatically add, to the LDAP directory, in response to the deployment of the particular service instance to the first identity domain, a new access control policy that specifies that an entity having the name of the particular service instance can only access information pertaining to the identity domain to which the particular service instance is being deployed.

\* \* \* \* \*

UNITED STATES PATENT AND TRADEMARK OFFICE
CERTIFICATE OF CORRECTION

PATENT NO.        : 9,069,979 B2                                   Page 1 of 1
APPLICATION NO.   : 14/019051
DATED             : June 30, 2015
INVENTOR(S)       : Srinivasan et al.

It is certified that error appears in the above-identified patent and that said Letters Patent is hereby corrected as shown below:

On the title page,

On page 3, in column 2, under other publications, line 3, delete "Idapsearch,"" and insert -- Ldapsearch," --, therefor.

In the specification,

In column 1, line 27, delete "purposes; and" and insert -- purposes. --, therefor.

In column 1, line 45, delete "as service (SaaS)" and insert -- as a service (SaaS) --, therefor.

In column 8, line 42, delete "Governanct" and insert -- Governance --, therefor.

Signed and Sealed this
Eighth Day of March, 2016

Michelle K. Lee
*Director of the United States Patent and Trademark Office*